(12) United States Patent
Detlefsen et al.

(10) Patent No.: US 9,679,437 B2
(45) Date of Patent: Jun. 13, 2017

(54) AUGMENTED REALITY FOR WAGERING GAME ACTIVITY

(75) Inventors: David E. Detlefsen, Northfield, IL (US); Mark B. Gagner, West Chicago, IL (US); Brian Gamache, Lake Forest, IL (US); Damon E. Gura, Chicago, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 519 days.

(21) Appl. No.: 13/321,592

(22) PCT Filed: Jun. 8, 2011

(86) PCT No.: PCT/US2011/039606
§ 371 (c)(1),
(2), (4) Date: Nov. 21, 2011

(87) PCT Pub. No.: WO2011/156475
PCT Pub. Date: Dec. 15, 2011

(65) Prior Publication Data
US 2012/0184352 A1    Jul. 19, 2012

Related U.S. Application Data

(60) Provisional application No. 61/352,614, filed on Jun. 8, 2010.

(51) Int. Cl.
*G07F 17/32* (2006.01)
*G06K 9/00* (2006.01)
(Continued)

(52) U.S. Cl.
CPC ...... *G07F 17/3225* (2013.01); *A63F 13/5255* (2014.09); *G06K 9/00624* (2013.01);
(Continued)

(58) Field of Classification Search
CPC .. G07F 17/32; G07F 17/3204; G07F 17/3218; G07F 17/323; G07F 17/3255;
(Continued)

(56) References Cited

U.S. PATENT DOCUMENTS

2003/0065805 A1    4/2003  Barnes, Jr.
2005/0213790 A1    9/2005  Rhoads et al.
(Continued)

FOREIGN PATENT DOCUMENTS

WO   WO 2009042190 A1 *  4/2009  ............ G07F 17/32
WO   WO-2011156475        12/2011

OTHER PUBLICATIONS

"PCT Application No. PCT/US11/39606 International Search Report", Oct. 11, 2011, 7 pages.
(Continued)

*Primary Examiner* — Werner Garner
(74) *Attorney, Agent, or Firm* — DeLizio Law, PLLC

(57) ABSTRACT

A method includes capturing media content of a wagering game machine at a wagering game establishment with a camera of a mobile device. A location of the mobile device is determined when the media content is captured. A direction that a lens of the camera is facing when the media content is captured is determined. The wagering game machine is identified based on the location and the direction. Overlay imagery derived from wagering game activity of the wagering game machine is downloaded into the mobile device from a server. The overlay imagery is composited onto the media content to create a composited media content. The composited media content is displayed on a display of the mobile device.

16 Claims, 18 Drawing Sheets

(51) Int. Cl.
  *G06T 19/00* (2011.01)
  *A63F 13/5255* (2014.01)

(52) U.S. Cl.
  CPC ..... *G06K 9/00664* (2013.01); *G06K 9/00671* (2013.01); *G06T 19/006* (2013.01); *G07F 17/323* (2013.01); *G07F 17/3255* (2013.01); *H04N 2201/3245* (2013.01)

(58) Field of Classification Search
  CPC ............. G07F 17/3225; G06T 19/006; G06K 9/00624; G06K 9/00664; G06K 9/00671; A63F 13/5255; H04N 2201/3245
  USPC .......................................................... 463/31
  See application file for complete search history.

(56) References Cited

U.S. PATENT DOCUMENTS

| | | | | |
|---|---|---|---|---|
| 2007/0054738 | A1* | 3/2007 | Muir | 463/42 |
| 2007/0135202 | A1* | 6/2007 | Linard | G07F 17/32 463/16 |
| 2008/0039197 | A1* | 2/2008 | Walker | G07F 17/32 463/30 |
| 2008/0096628 | A1 | 4/2008 | Czyzewski et al. | |
| 2008/0108435 | A1* | 5/2008 | Nelson | G07F 17/32 463/42 |
| 2008/0194323 | A1* | 8/2008 | Merkli et al. | 463/30 |
| 2008/0214166 | A1 | 9/2008 | Ramer et al. | |
| 2008/0268934 | A1 | 10/2008 | Mattice et al. | |
| 2009/0040370 | A1 | 2/2009 | Varanasi | |
| 2009/0088243 | A1* | 4/2009 | Gagner et al. | 463/25 |
| 2010/0227662 | A1* | 9/2010 | Speer, II | G07F 17/32 463/16 |
| 2010/0257252 | A1* | 10/2010 | Dougherty et al. | 709/217 |
| 2011/0292076 | A1* | 12/2011 | Wither | G06F 17/30265 345/632 |

OTHER PUBLICATIONS

"PCT Application No. PCT/US11/39606 International Preliminary Report on Patentability", Dec. 20, 2012, 6 pages.

* cited by examiner

AUGMENTED REALITY FOR WAGERING GAME ACTIVITY

RELATED APPLICATIONS

This application claims the priority benefit of U.S. Provisional Application Ser. No. 61/352,614 filed Jun. 8, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly to wagering game systems that includes augmented reality.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a computerized method comprises capturing media content of a wagering game machine at a wagering game establishment with a camera of a mobile device; determining a location of the mobile device when the media content is captured; determining a direction that a lens of the camera is facing when the media content is captured; identifying one or more the wagering game machines based on the location and the direction; downloading, into the mobile device from a server, overlay imagery derived from wagering game activity of the one or more wagering game machines; compositing the overlay imagery onto the media content to create a composited media content; and displaying the composited media content on a display of the mobile device.

In some embodiments, the determining of the location of the mobile device comprises determining the location of the mobile device with a global positioning system module of the mobile device.

In some embodiments, the determining of the location of the mobile device comprises determining the location of the mobile device using a cellular infrastructure to triangulate the location of the mobile device.

In some embodiments, identifying the one or more wagering game machines comprises transmitting the location and the direction to the server; and receiving an identification of the one or more wagering game machines from the server.

In some embodiments, the overlay imagery is derived from at least one of past wagering game activity of the user of the mobile device and a statistic of past wagering game activity of the one or more wagering game machines.

In some embodiments, the wagering game activity comprises past wagering game activity of the user of the mobile device, wherein the past wagering game activity is retrieved from at least one of a player tracking account provided by the wagering game establishment or a player account provided by a manufacturer of the one or more wagering game machines.

In some embodiments, the overlay imagery is derived from a suggestion to play a different type of wagering game machine based on a type of the one or more wagering game machines.

In some embodiments, the overlay imagery comprises an interface to enable a user of the mobile device to perform a side wager relative to the wagering game activity of the one or more wagering game machines.

In some embodiments, a computerized method comprises capturing media content of a wagering game machine at a wagering game establishment with a camera of a mobile device of an operator of the wagering game establishment; capturing media content of at least one display in the wagering game establishment with the camera of the mobile device; locating a watermark embedded in the media content of the at least one display in the wagering game establishment; decoding the watermark to determine a location and a position of the mobile device; identifying the wagering game machine based on the location and the direction; identifying a wagering game player playing a wagering game at the wagering game machine when the media content is captured; downloading, into the mobile device from a server, overlay imagery derived from wagering game activity of the wagering game player; overlaying the overlay imagery onto the image to create an overlaid media content; and displaying the overlaid media content on a display of the mobile device.

In some embodiments, identifying the wagering game machine comprises transmitting the captured media content to the server; and receiving an identification of the wagering game machine from the server based on the media content transmitted to the server.

In some embodiments, identifying the wagering game machine comprises transmitting the location and the direction to the server; receiving an identification of the wagering game machine from the server.

In some embodiments, identifying the wagering game player comprises identifying the wagering game player based an identification of the wagering game machine.

In some embodiments, identifying the wagering game player comprises extracting an image, from the media content, of a display of the wagering game machine; locating a watermark in the image; and identifying the wagering game player based on the watermark in the image.

In some embodiments, the overlay imagery is derived from an amount of money that the wagering game player has spent at the wagering game establishment over a time period.

In some embodiments, a mobile device comprises a camera configured to capture an image of a wagering game machine at a wagering game establishment; a global positioning system module configured to determine a location of the mobile device while the image is captured; a compass configured to determine a direction that a lens of the camera is facing while the image is captured; an overlay module configured to identify the wagering game machine based on the location and the direction; download, into the mobile device from a server, overlay imagery derived from at least one of past wagering game activity of the user of the mobile device, a statistic of past wagering game activity of the wagering game machine, and a suggestion to play a different type of wagering game machine based on a type of the wagering game machine; and overlay the overlay imagery onto the image to create an overlaid image; and display the overlaid image on a display of the mobile device.

In some embodiments, the overlay module is configured to identify based on a transmission of the location and the direction to the server, wherein the overlay module is configured to receive an identification of the wagering game machine from the server.

In some embodiments, the overlay module is configured to retrieve the past wagering game activity of the user of the mobile device from at least one of a player tracking account provided by the wagering game establishment or a player account provided by a manufacturer of the wagering game machine.

In some embodiments, one or more machine-readable storage media includes instructions which, when executed by one or more processors, cause the one or more processors to perform operations comprising capturing media content of signage, at a mercantile establishment that is remote from a wagering game establishment, with a camera of a mobile device; determining a location of the mobile device with a global positioning system module of the mobile device when the media content is captured; determining a direction that a lens of the camera is facing when the media content is captured, using a compass of the mobile device; identifying the signage based on the location and the direction; downloading, into the mobile device from a server, overlay imagery that provides a play-while-away update for a wagering game activity occurring at the wagering game establishment; overlaying the overlay imagery onto the media content to create an overlaid media content; and displaying the overlaid media content on a display of the mobile device.

In some embodiments, identifying the signage is based on the location of the signage and comprises transmitting the location and the direction to the server; and receiving an identification of the signage from the server.

In some embodiments, the play-while-away update comprises at least one of an amount of winnings and an amount of money remaining for a play-while-away game wherein a user of the mobile device is a wagering game player of the play-while-away game.

In some embodiments, the media content comprises an image of the signage.

In some embodiments, an apparatus comprises means for capturing media content of signage, at a sporting event, with a camera of a mobile device; means for determining a location of the mobile device when the media content is captured; means for determining a direction that a lens of the camera is facing when the media content is captured; means for identifying the signage based on the location and the direction; means for downloading, into the mobile device from a server, overlay imagery that provides a user interface to enable a user of the mobile device to enter a wager based on the sporting event; means for overlaying the overlay imagery onto the media content to create an overlaid media content; means for displaying the overlaid media content on a display of the mobile device; and means for transmitting the wager entered by the user to the server.

In some embodiments, the means for identifying the signage is based on the location of the signage and comprises means for transmitting the location and the direction to the server; and means for receiving an identification of the signage from the server.

In some embodiments, the signage comprises at least one of a scoreboard at the sporting event, a symbol on a field of play of the sporting event and a sign identifying a stadium where the sporting event is being played.

In some embodiments, the user interface is to enable a selection of a type of wager, wherein the type of wager comprises a winner of the sporting event.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into six sections. The first section provides an introduction to some example embodiments, while the second section describes example mobile device architectures. The third section describes different overlaid media content examples, according to some example embodiments, and the fourth section describes example operations performed by some embodiments. The fifth section describes wagering game machine architectures and wagering game networks and the sixth section presents some general comments.

Introduction

This section provides an introduction to some example embodiments that use mobile devices to augment wagering game activities. A mobile device can be any type of portable computer device, including a cellular telephone, a Personal Digital Assistant (PDA), smartphone, etc. The mobile device can comprise a display, a Global Positioning System (GPS) module, a compass, a camera and various other input/output (I/O) components. In some example embodiments, the mobile device can also be a wager game device.

The mobile device is used to provide an augmented reality for various wagering game environments, to provide various locations for monitoring wagering game activities, to facilitate wagering at sporting events and other live events, and more. The mobile device captures imagery, sound, location information, or any other media content in a wagering game environment, at a sporting event, etc. The mobile device then superimposes an overlay imagery onto the captured media content. The overlay imagery can be text, pictures, video, or any combination thereof. The overlay imagery can be graphics or text viewable by a user of the mobile device. The overlay imagery can also be an interface (e.g., Graphical User Interface) to which the user can input data (e.g., wagers, side betting, etc.).

Figure 1:
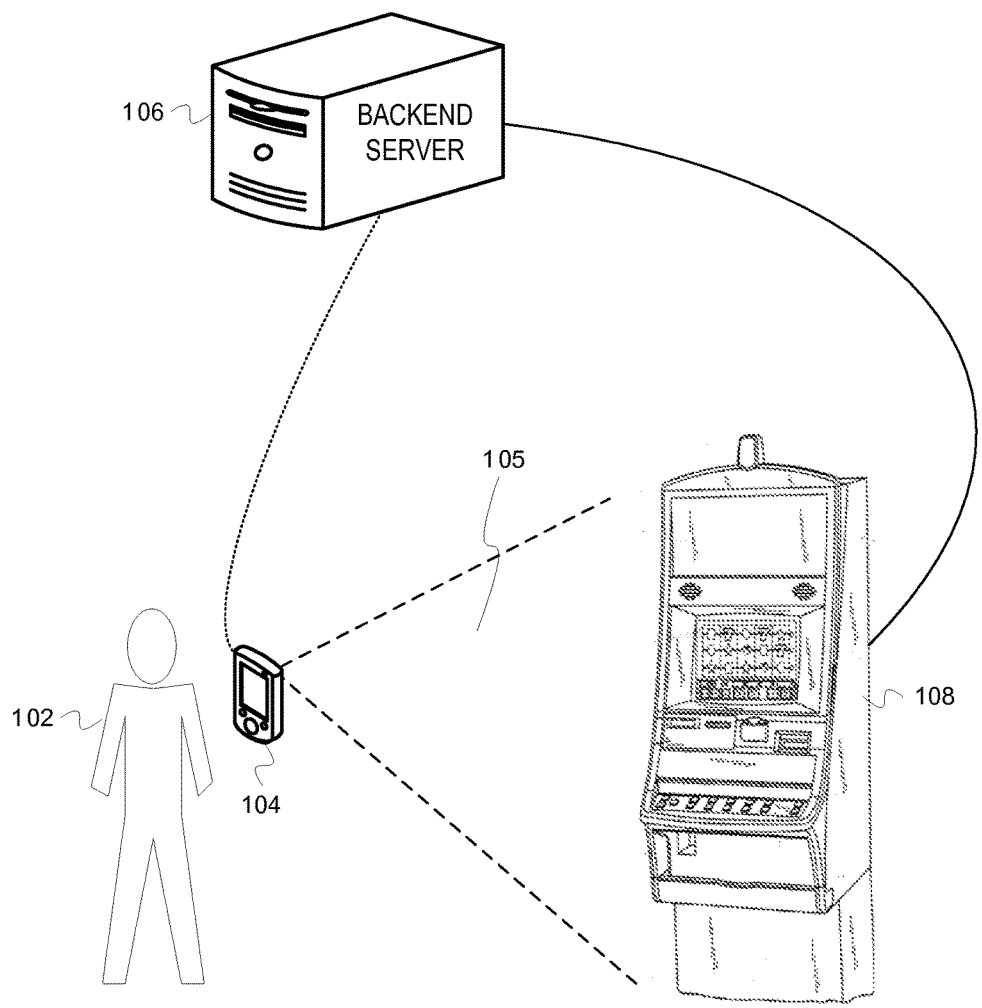
FIG. 1 is a diagrammatic illustration of a wagering game configuration for providing augmented reality, according to some example embodiments.

FIG. 1 is a diagrammatic illustration of a wagering game configuration for providing augmented reality, according to some example embodiments. FIG. 1 includes a player 102 using a mobile device 104. The mobile device 104 includes a camera (not shown in FIG. 1) that is capturing media content 105 (e.g., a still image or motion video) of a wagering game machine 108. As further described below, the captured media content can be of various objects at wagering game environments, at locations offsite from a wagering game environment for monitoring wagering game activities, at sporting events, etc. FIG. 1 also includes a backend server 106 that represents any number of servers (e.g., wagering game sever, account server, etc.). As shown, the mobile device 104 and the wagering game machine 108 can communicate with the server 106. In some instances, the mobile device 104 communicates wirelessly to the wagering game machine 108 and the backend server 106, whereas the machine 108 communicates over a wire to the server 106.

In some example embodiments, the mobile device 104 uses the captured media content (e.g., a photo of the wagering game machine 108) and overlay images (e.g., text) to provide an augmented reality associated with the wagering game machine 108. For a wagering game machine, the overlay imagery can include data about past activities of the specific wagering game machine, data about the theme currently appearing on the specific wagering game machine, data about the wagering game player currently playing at the wagering game machine, etc. For example, data about past wagering game activities can identify when the last time the wagering game machine awarded its highest jackpot, the frequency of hitting a jackpot for this wagering game machine, etc.

The overlay imagery can also suggest other types of wagering game machines to play. Thus, the augmented reality environment can drive players to related machines. For example, assume that the captured media content is of a wagering game machine having a theme related to game show A. The overlay imagery can identify wagering game machines having a theme related to game show B. Also, these other types of wagering game machines can be from a same or different manufacturer. Accordingly, a manufacturer can provide such overlay imagery for images of its competitor's wagering game machines to attract players to its own wagering game machines.

In another example, the overlay imagery can provide an image or video of a player's past wagering game activity. For instance, the player's past wagering game activity can be previous big wins, previous jackpots, previous trophies, points needed to reach the next level of a level-based game play, etc. In some example embodiments, a backend server can retrieve the player's wagering game activity from a player tracking account maintained by the casino. In some instances, the backend server can retrieve the player activity information from a player account maintained by the manufacturer of the wagering game machine. Such an account can be a casino-based account and/or an online account for the player.

In some embodiments, the overlay imagery can enable side wagering or betting relative to the wagering game machine of which media content is captured. Accordingly, the overlay imagery enables the player 102 to input bets relative to a game currently being played on the wagering game machine 106. Such an embodiment can allow game play when all wagering game machines are occupied by other players.

The overlay imagery can also provide, on the mobile device, virtual instances of games being played on the wagering game machine whose image is captured (e.g., machine 106). Accordingly, the player can use virtual game instances to play games being played on a wagering game machine for which media content is captured. Thus, wagering game activities on the mobile device can be independent of the activities occurring at the wagering game machine.

In another application, the overlay imagery can provide instructions for strategy for the wagering game being played at the wagering game machine. For example, if the wagering game comprises video poker, the overlay imagery can include instructions on which cards to discard, whether to fold, etc. based on the hand being displayed on the wagering game machine. Such imagery can be used relative to side betting on the wagering game being played, learning how to play, etc.

The overlay imagery can also be a language translation of the wagering game machine. Accordingly, if the language of the text of the wagering game machine is English, the overlay imagery can be Japanese, Chinese, German, etc. In particular, the language can be specific to the player 102 using the mobile device 104. Also, the translation can be for the static images of the wagering game machine (e.g., title, instructions, etc.), the dynamic real time images (e.g., the spin results) being produced in response to the wagering game activity, or a combination thereof.

In some example embodiments, the player 102 can use augmented reality to track "play-while-away" gaming at various locations. Play-while-away gaming involves wagering games that do not require players to be present at a casino. In some instances, players initiate play-while-away games at a casino. After leaving the casino, they can use augmented reality to monitor their play-while-away games. A backend server at a casino (or other such wagering game establishment) monitors play-while-away games for different wagering game players. Accordingly, the mobile device 104 can provide updates about playing-while-away gaming for the player 102. For example, if the mobile device 104 captures media content of signage (e.g., a corporate logo) at a particular mercantile establishment (e.g., restaurant or store), the mobile device 104 can then output overlay imagery onto the signage that provides these updates to "playing while away" gaming. Such an application can encourage the user of mobile devices to dine at certain restaurants or shop a certain stores.

In another application, the user of the mobile device 104 can wager bets for a sporting event while the user is at the sporting event. For example, if the captured media content comprises signage (e.g., the scoreboard) at the sporting event, the mobile device 104 can then output overlay imagery that enables the user to input one or more wagers relative to the sporting event (e.g., winner, athlete scoring the most points in the event, etc.).

In another application, the overlay imagery can enable a user of the mobile device 104 to locate the location of others persons in the wagering game establishment. In particular, the captured media content can include a video taken throughout a casino. The overlay imagery could include light, color, etc. to identify the location of certain persons associated with the player 102. Such persons can include friends, family members, online social contacts, etc. that consent to such identification (as further described below).

Also, for any of the above-referenced applications and embodiments, such applications and embodiments can be tailored for a specific wagering game establishment and/or user of the mobile device 104. In particular, more or less information can be provided via the overlay imagery based on the specific wagering game establishment and/or user of the mobile device 104. For example, the back end server 106 and mobile device 104 can provide richer overlay information for high-value patrons, as compared to other patrons.

In some example embodiments, casino operators can use the mobile device 104 at wagering game establishments. Accordingly, the overlay imagery can include statistics about wagering game machines, backend servers, etc. For example, the statistics can include the amount of wagering game activity or inactivity, the payouts, the number and types of wagering game players, etc. for a given time period (e.g., the current day, last hour, etc.).

Also, for operator usage, the overlay imagery can include an identification of the wagering game player currently playing at a wagering game machine. The overlay imagery can include the amount of money the player has spent for a given time period, if the player is having a winning trend or losing trend, and more. For example, if the player is a "big spender" that is currently in a losing trend, the overlay imagery can be a picture of a whale with a red down arrow. In such a situation, the operator can provide free "comps" for the player. For example, the operator can remotely communicate with a backend server to issue a number of credits to an account for the wagering game player. The operator can also issue, to the account, a free night stay at the hotel, free dinner, etc. Also, for operator usage, the captured media can include part of casino's gaming floor. Accordingly, the overlay imagery can include video or data about traffic patterns for that part of the gaming floor.

While described such that overlay imagery can be derived from data from the wagering game manufacturer or the wagering game establishment, in some other example embodiments, the data can be from other wagering game players. For example, the wagering game players can input reviews or other relevant data regarding a wagering game machine. The players can input such data after having their own augmented reality experience, after playing or watching the wagering game machine, etc. Accordingly, the overlay imagery can be derived from any combination of the data from the wagering game manufacturer, data from the wagering game establishment, and data from wagering game players.

Although FIG. 1 describes some embodiments, the following sections describe many other features and embodiments.

Mobile Device Architecture

Figure 2:
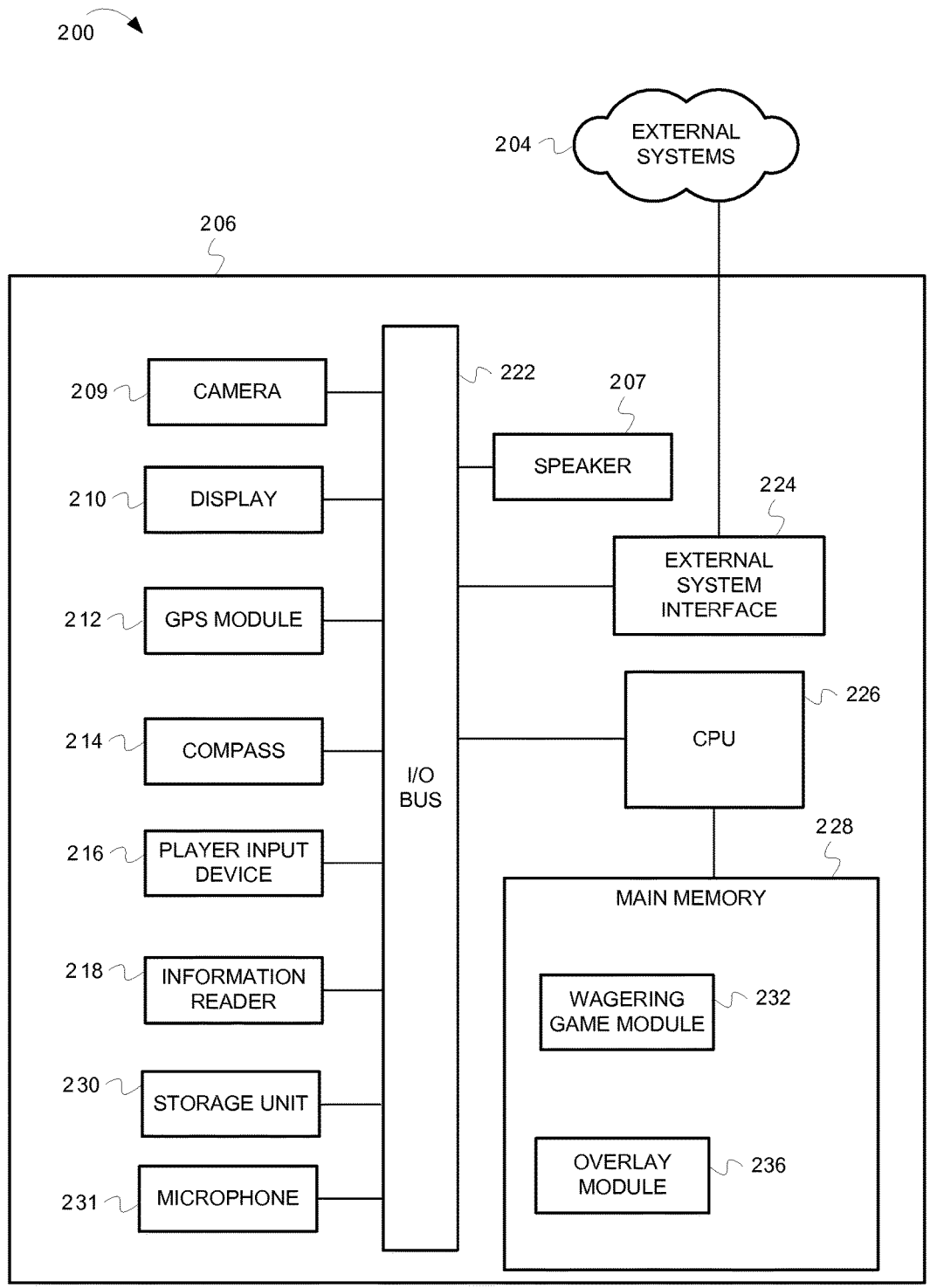
FIG. 2 is a block diagram illustrating a mobile device architecture, according to some example embodiments.

This section describes an example mobile device architecture and presents structural aspects of some embodiments. FIG. 2 is a block diagram illustrating a mobile device architecture, according to some example embodiments. As shown in FIG. 2, a mobile device architecture 200 includes a mobile device 206, which includes a central processing unit (CPU) 226 connected to a main memory 228. The CPU 226 can include any suitable processor, such as an Intel® Pentium processor, Intel® Core 2 Duo processor, AMD Opteron™ processor, or UltraSPARC processor. The main memory 228 includes a wagering game module 232 and an overlay module 236.

The CPU 226 is also connected to an input/output (I/O) bus 222, which can include any suitable bus technologies, such as an AGTL+ frontside bus and a PCI backside bus. The I/O bus 222 is connected to a camera 209, a speaker 207, a display 210, a Global Positioning System (GPS) module 212, a compass 214, a player input device 216, an information reader 218, a storage unit 230 and a microphone 231. The I/O bus 222 is also connected to an external system interface 224, which is connected to external systems 204 (e.g., backend servers). In some embodiments, an accelerometer is also connected to the bus 222.

In some embodiments, the mobile device 206 can include additional peripheral devices and/or more than one of each component shown in FIG. 2. For example, in one embodiment, the mobile device 206 can include multiple external system interfaces 224 and/or multiple CPUs 226. In one embodiment, any of the components can be integrated or subdivided.

In some embodiments, the wagering game module 232 can present wagering games, such as video poker, video black jack, video slots, video lottery, etc., in whole or part. The overlay module 236 can capture different types of media content (e.g., image, video, audio, etc.) using different input/output components of the mobile device 206. Media content can include image content (e.g., files in JPEG format, TIFF format, GIF format, etc.), video content (e.g., files in MPEG format, QuickTime® format, MOV format, etc.), audio content (e.g., files in MP3 format, WAV format, etc.). The overlay module 236 can also determine an identification of the device, component, etc. (e.g., a wagering game machine) of which media content is being captured. For example, the overlay module 236 can capture an image of a wagering game machine using the camera 209. The overlay module 236 can identify that the image is of a given wagering game machine among many machines in a wagering game establishment. In some example embodiments, the overlay module 236 uses the GPS module 212 to determine the position of the mobile device 206 at the time the media content is captured. Also, the overlay module 236 can use the compass 214 to determine the direction that a lens of the camera 209 was facing at the time the media content was captured.

Alternatively or in addition, the overlay module 236 can determine the position and direction of the mobile device 206 based on watermarks that are embedded in game displays, wagering game establishment signage, etc. The mobile device 206 can be used to capture screenshots of these different displays, signage, etc. having the embedded watermarks. The overlay module 236 can then perform optical character recognition of the screenshots. The overlay module 236 can then determine the embedded watermarks based on the optical character recognition. The overlay module 236 then decodes the embedded watermarks to identify the location. In particular, the decoded data provides a location of the display, signage, etc. in which the watermark is embedded. The overlay module 236 can then determine the position and direction of the mobile device 206 based on watermark(s) in one or more displays, signage, etc. Embodiments that use the embedded watermarks can be particularly useful in situations where a GPS signal cannot be received. Various combinations of GPS, a compass and embedded watermarking can be used to determine a location and a direction of the mobile device. For example, the embedded watermarking can be used to determine a location, while a compass is used to determine a direction. In another example, all three are used to provide a redundancy check on the proper location and direction.

Based on this position and direction, the overlay module 236 can then identify the object (e.g., the wagering game machine). In some example embodiments, the overlay module 236 can then retrieve overlay imagery from different sources (e.g., backend servers, a wagering game machine, etc.) based on the component about which media content is captured. Different examples of components about which media content is captured and the different types of overlay imagery are described in more detail below. The overlay module 236 can output overlay media content through different output components of the mobile device 206. For example, the overlaid images or videos can be output to the display 210, and overlaid audio can be output to the speaker 207.

Any component described herein can include hardware, firmware, and/or machine-readable storage media including instructions for performing the operations described herein. Machine-readable storage media includes any mechanism that stores provides information in a form readable by a machine (e.g., a wagering game machine, computer, etc.). For example, machine-readable storage media includes read only memory (ROM), random access memory (RAM), magnetic disk storage media, optical storage media, flash memory machines, etc. Some embodiments include machine-readable signal media, which include any media suitable for transmitting software over a network (e.g., Ethernet media, fiber optic media, etc.).

Overlaid Media Content Examples

This section describes different overlay media content examples, according to some example embodiments. The examples include different types of objects that are captured in different media content. The examples also include different types of overlay imagery that can be superimposed onto the captured media content to form overlaid media content.

Figure 3:
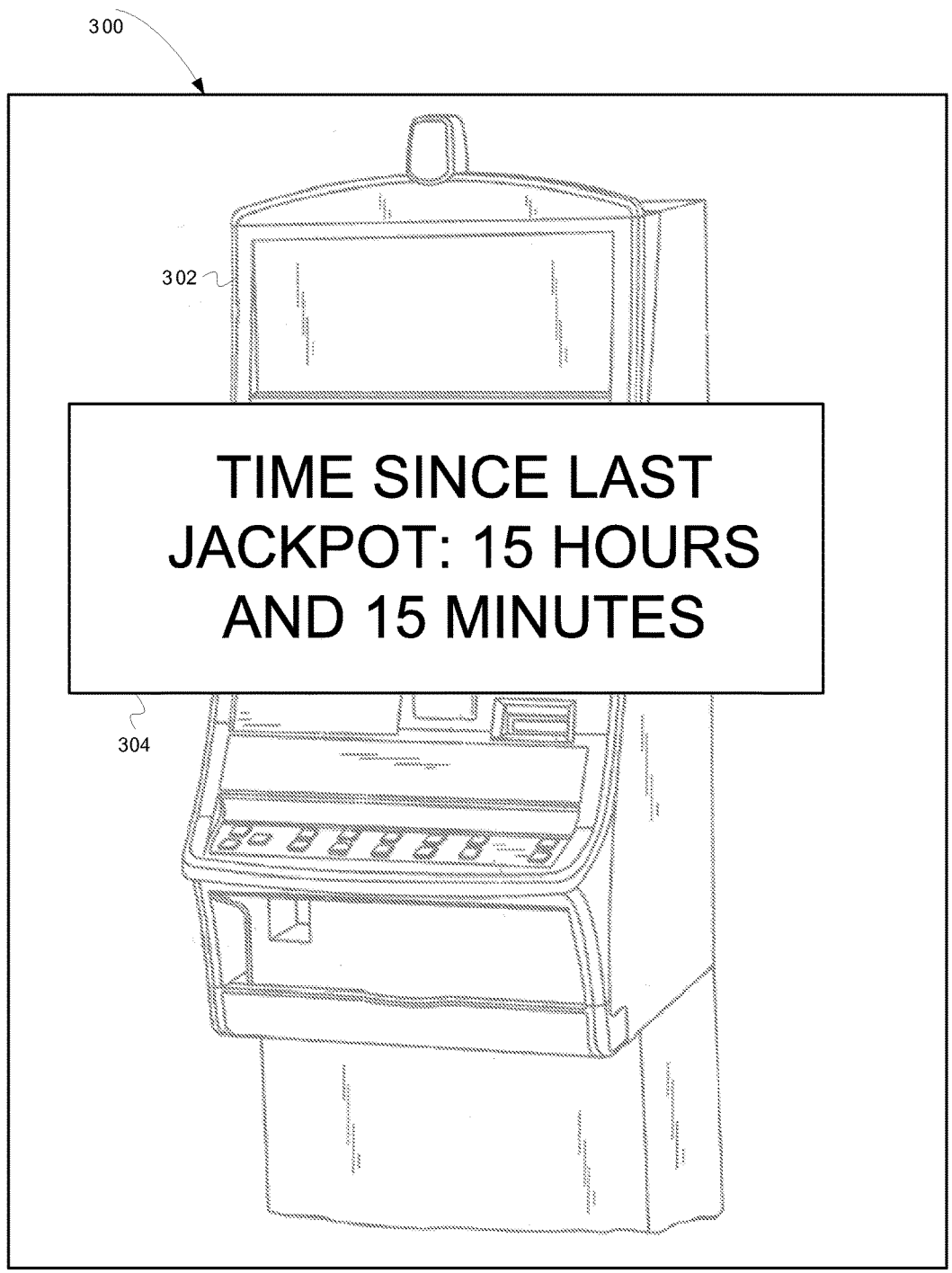
FIG. 3 is a screenshot of a display of a mobile device providing augmented reality that shows attributes of previous wagering game activity for a wagering game machine, according to some example embodiments.

FIG. 3 is a screenshot of a mobile device's display providing augmented reality that shows previous wagering game activity for a wagering game machine, according to some example embodiments. FIG. 3 includes a screenshot 300. In this example, the captured media content includes an image of a wagering game machine 302. For example, patrons of a wagering game establishment can capture this image with their mobile device while walking through the wagering game establishment. The overlay imagery 304 comprises text that identifies the last time the wagering game machine 302 awarded a jackpot.

Figure 4:
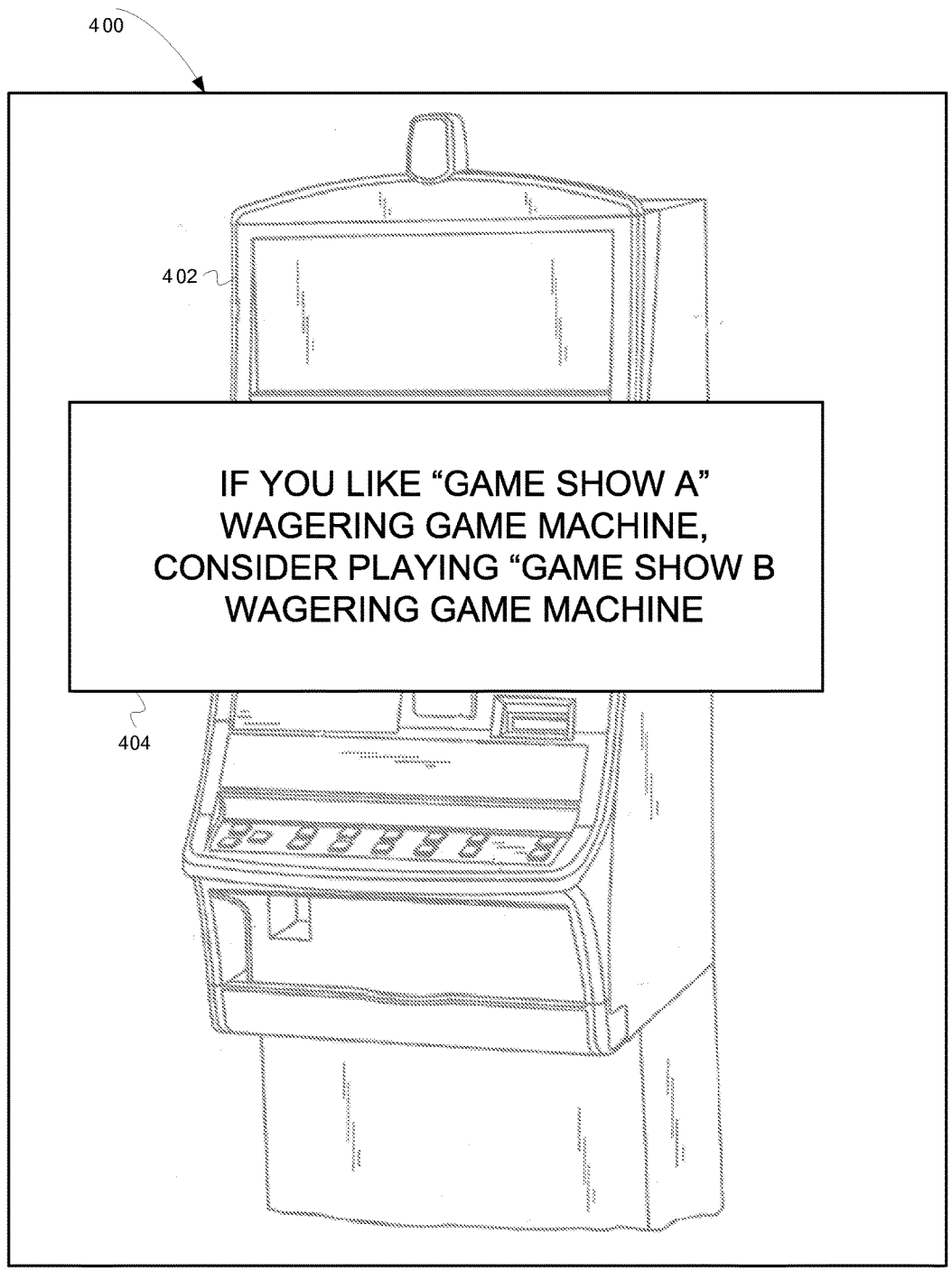
FIG. 4 is a screenshot of a display of a mobile device providing augmented reality that recommends a similar type wagering game machine relative to the currently viewed wagering game machine, according to some example embodiments.

FIG. 4 is a screenshot of a mobile device's display providing augmented reality that recommends a similar type wagering game machine relative to the currently viewed wagering game machine, according to some example embodiments. FIG. 4 includes a screenshot 400. In this example, the captured media content includes an image of a wagering game machine 402. The overlay imagery 404 includes text that recommends a similar type of wagering game machine based on the wagering game machine 402. For example, the wagering game machine 402 and the recommended machine can have similar themes (game show-based themes). This augmented reality can be used to encourage a user of the mobile device to play a wagering game machine with a similar theme, but from a different manufacturer.

Figure 5:
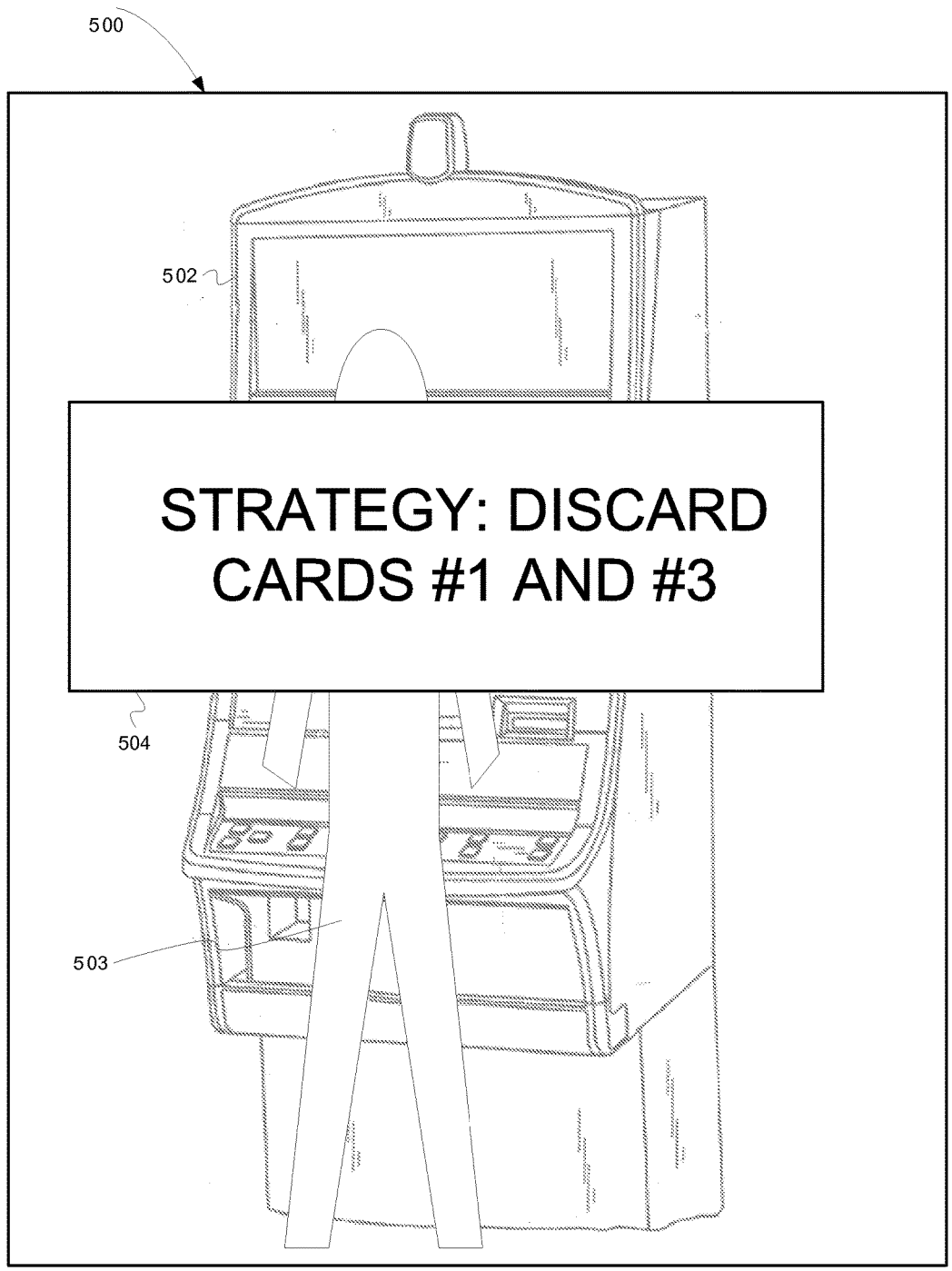
FIG. 5 is a screenshot of a display of a mobile device providing augmented reality that shows strategy for the wagering game play occurring at a wagering game machine, according to some example embodiments.

FIG. 5 is a screenshot of a display of a mobile device providing augmented reality that shows strategy for the wagering game play occurring at a wagering game machine, according to some example embodiments. FIG. 5 includes a screenshot 500. In this example, the captured media content includes an image of a wagering game player 503 playing a wagering game machine 502. The overlay imagery 504 comprises text that provides strategy for a game occurring at the wagering game machine 502. For example, if the wagering game is video poker, the strategy can identify which cards to discard, whether to fold, etc.

The strategy can be provided to the mobile device a number of ways. In some example embodiments, a screenshot of the wagering game play can be captured. Optical character recognition processing of the screen shot can then be used to determine the game state (e.g., the cards being displayed for video poker). Based on the game state, the strategy can then be determined. In some other example embodiments, the strategy can be derived from a dynamic tag or watermark on the screen of the wagering game machine. Again, a screenshot of the wagering game play can be captured. Optical character recognition processing of the screen shot can then locate and determine the dynamic tag. The tag can then be decoded. In some example embodiments, the decoded data provides the strategy directly. Alternatively, the decoded data can be the game state. The optimal strategy can then be determined based on the game state. This processing can occur at a remote server or locally in the mobile device. For example, some of the processing can occur at the remote server, while the remaining processing can occur at the mobile device.

Figure 6:
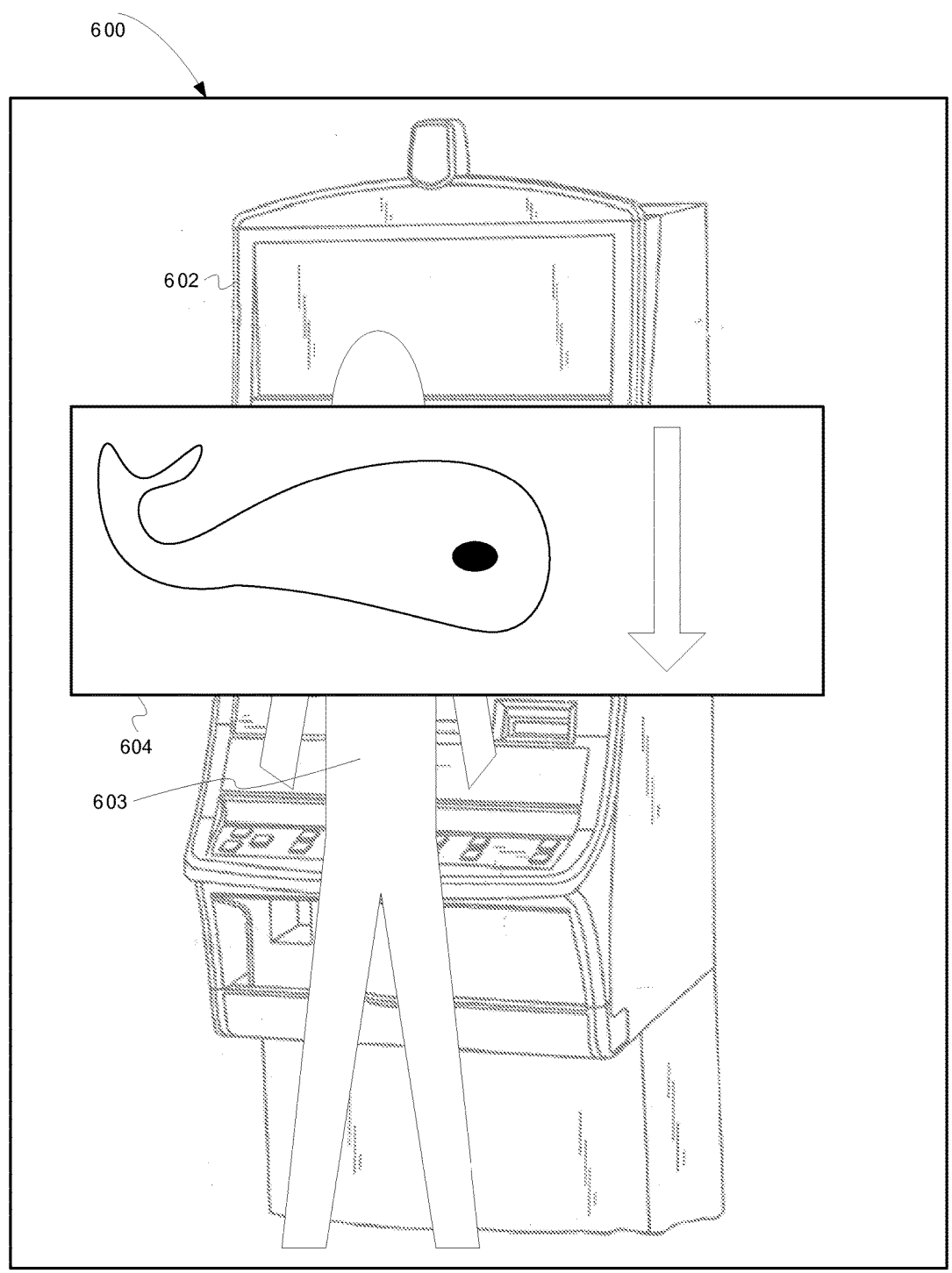
FIG. 6 is a screenshot of a display of a mobile device providing augmented reality that shows attributes of a wagering game player relative to a wagering game machine, according to some example embodiments.

FIG. 6 is a screenshot of a mobile device's display providing augmented reality that shows attributes of a wagering game player relative to a wagering game machine, according to some example embodiments. FIG. 6 includes a screenshot 600. In this example, the captured media content includes an image of a wagering game player 603 playing a wagering game machine 602. The overlay imagery in this example comprises an image 604 of a whale and a down arrow. The whale represents that the wagering game player 603 has spent money beyond a certain level at the wagering game establishment. Other images can be used to indicate that the wagering game player 603 is spending at other levels. Also, the down arrow indicates that the wagering game player 603 is currently in a losing trend over a defined period (e.g., last hour, last 24 hours, etc.). The trend can be relative to the particular wagering game machine 602. Alternatively, the trend can be relative to any wagering game activity that is trackable in a casino. In some example embodiments, this augmented reality application is only accessible by operators at the wagering game establishment. Such information can enable the operators to identify the "big spenders" in the wagering game establishment. Also, if such patrons are in a losing trend, the operator can provide additional credits or compensation to the wagering game player to try to alleviate the losses. In some example embodiments, the mobile device can communicate with backend servers to provide these additional credits or compensation.

Figure 7:
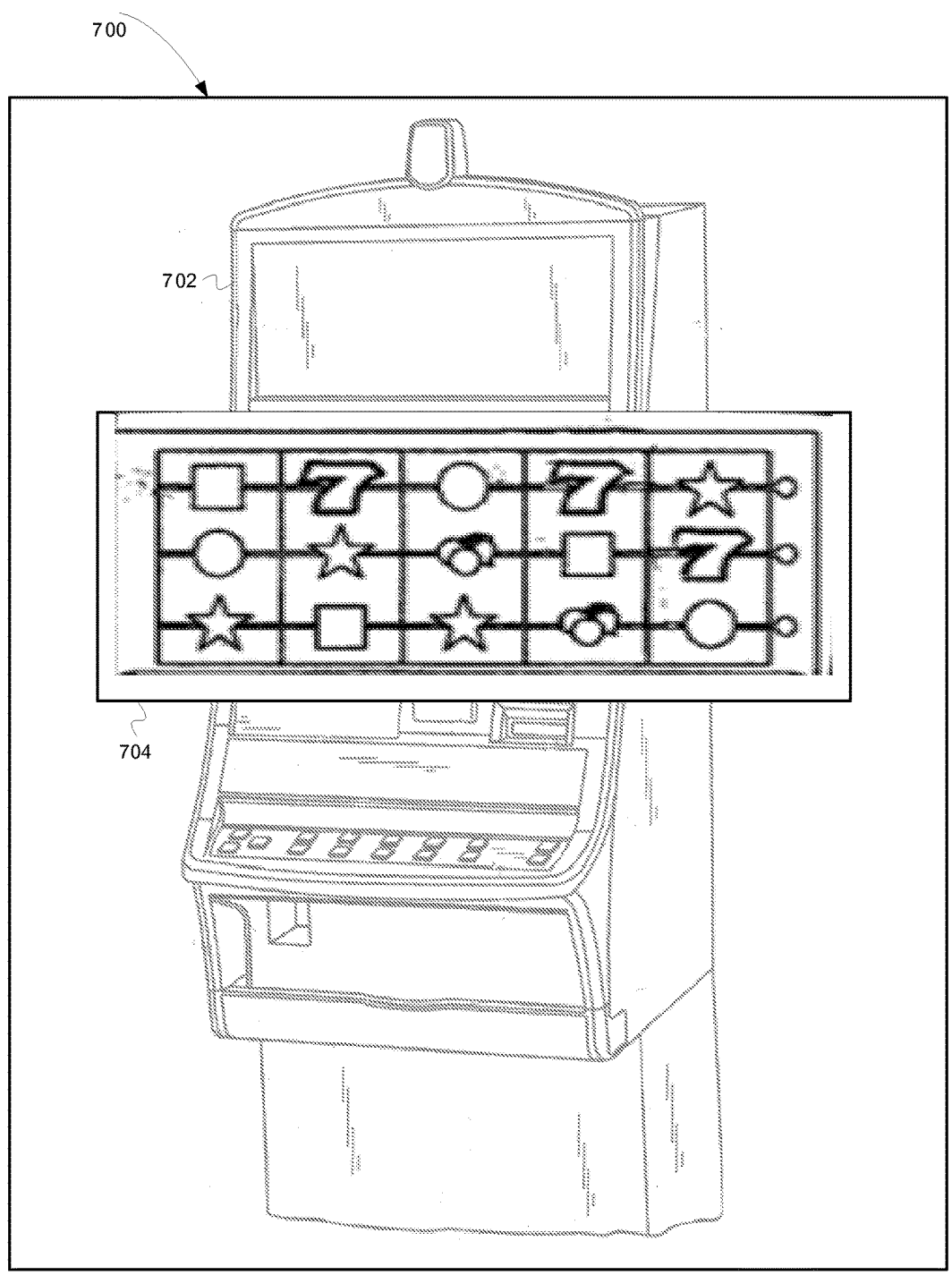
FIG. 7 is a screenshot of a display of a mobile device providing augmented reality that shows a previous win for a wagering game machine, according to some example embodiments.

FIG. 7 is a screenshot of a mobile device's display providing augmented reality that shows a previous win for a wagering game machine, according to some example embodiments. FIG. 7 includes a screenshot 700. In this example, the captured media content includes an image of a wagering game machine 702. The overlay imagery 704, in this example, comprises a video showing a previous wagering game activity that occurred on the wagering game machine 702. For example, the video can show a previous big win, jackpot, etc. that was won by the user of the mobile device. Accordingly, a user of the mobile device can show their family, friends, etc. one of their previous wins. In some instances, the overlay imagery 704 can include previous activities on machines having a same theme.

Figure 8:
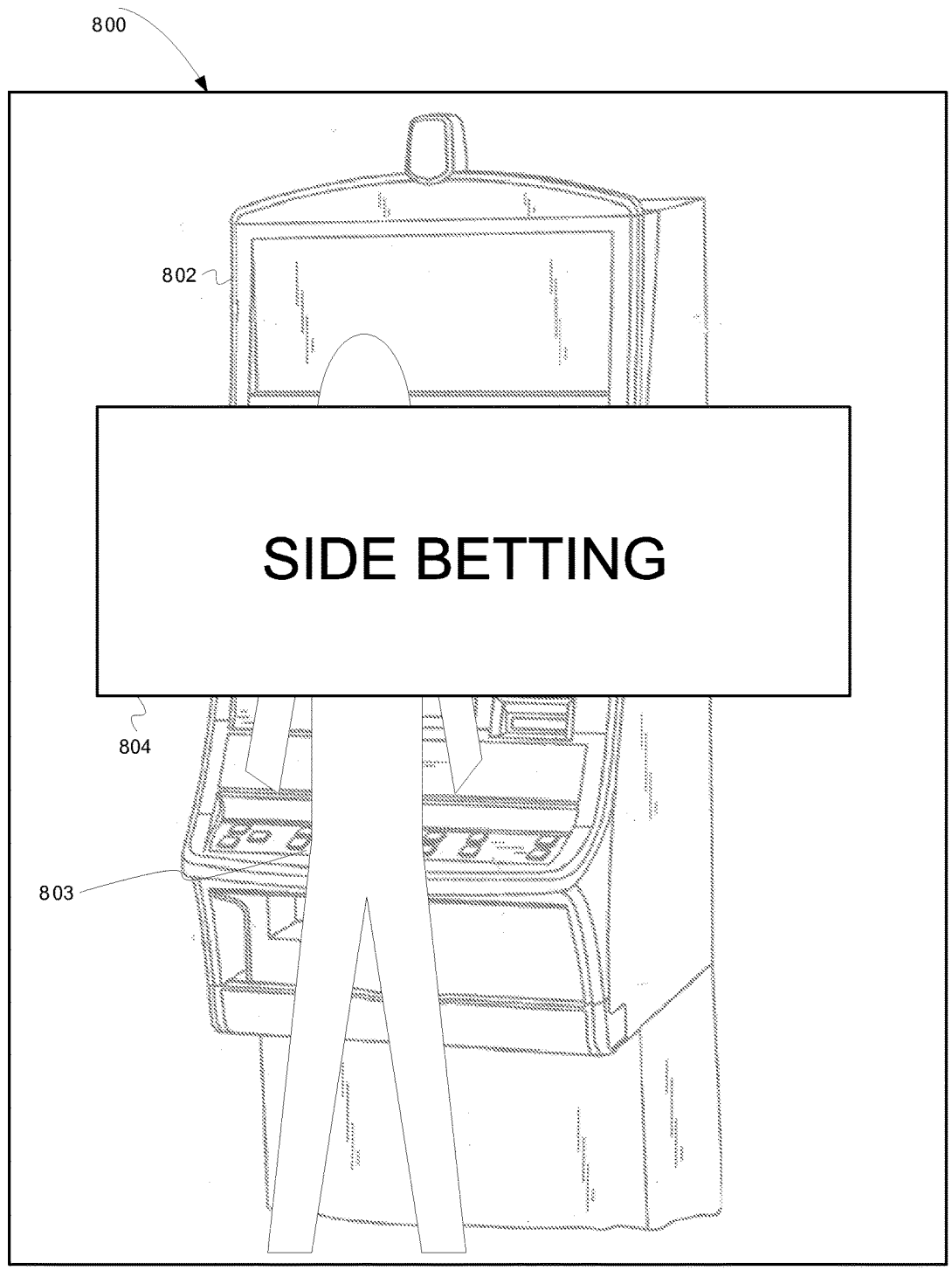
FIG. 8 is a screenshot of a display of a mobile device providing augmented reality that enables side betting for a wagering game machine, according to some example embodiments.

FIG. 8 is a screenshot of a mobile device's display providing augmented reality that enables side betting for a wagering game machine, according to some example embodiments. FIG. 8 includes a screenshot 800. In this example, the captured media content includes an image of a wagering game player 803 playing a wagering game machine 802. The overlay imagery 804 in this example comprises a graphical user interface to enable side wagering or betting relative to the wagering game activity occurring at the wagering game machine 802. For example, the side betting can include a wager on whether a jackpot will occur, whether a certain level of win will occur, whether a certain number and type of symbol will be part of a slots game result, etc.

Figure 9:
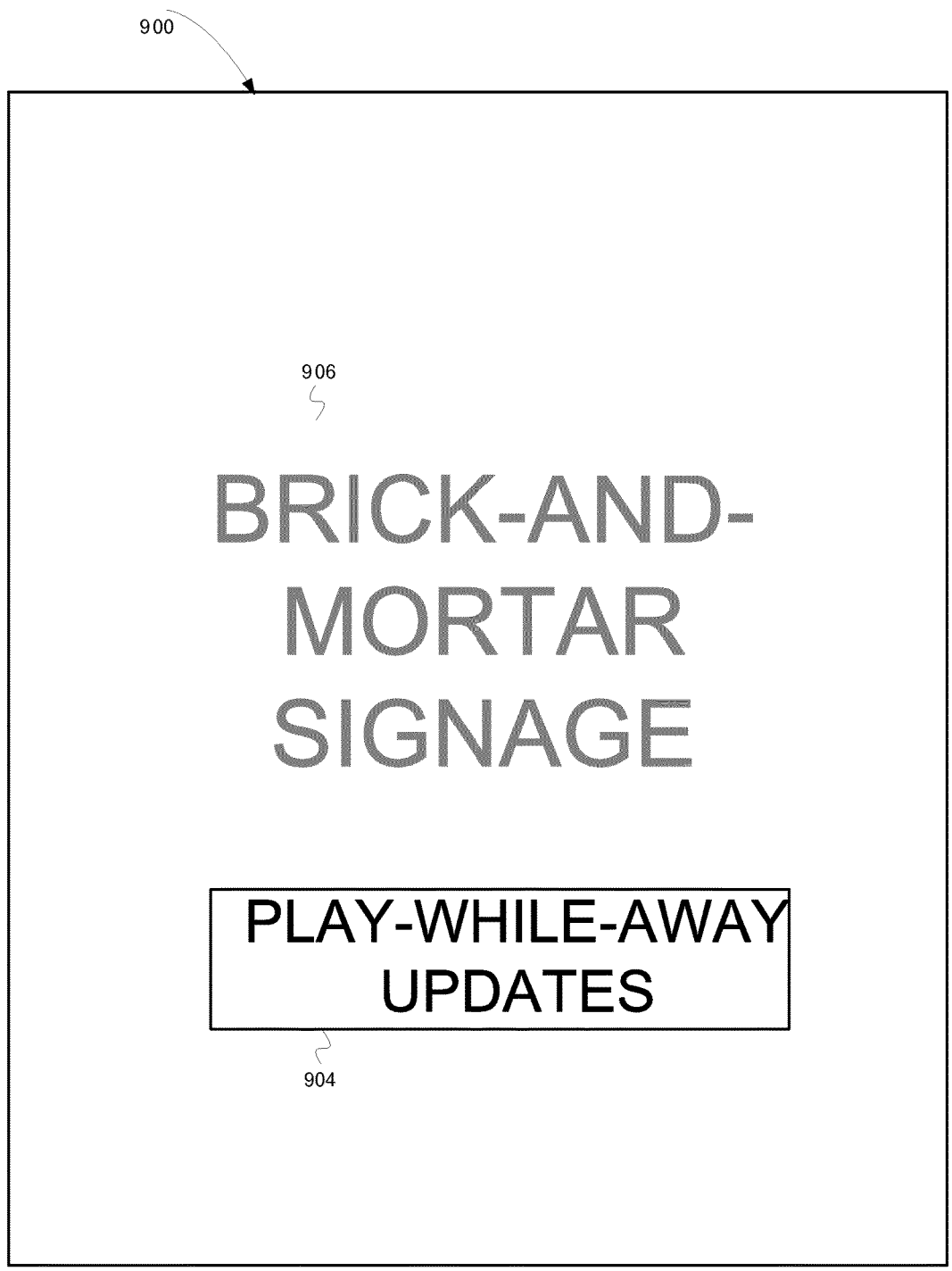
FIG. 9 is a screenshot of a display of a mobile device providing augmented reality that shows play-while-away updates for wagering game activity while a user is not in the wagering game establishment, according to some example embodiments.

FIG. 9 is a screenshot of a mobile device's display providing augmented reality that shows play-while-away updates for wagering game activity while a user is not in the wagering game establishment, according to some example embodiments. FIG. 9 includes a screenshot 900. In this example, the captured media content includes an image 906 of a brick-and-mortar signage. Examples of such signage include signs at mercantile establishments (e.g., restaurants, retail stores, etc.). The overlay imagery 904, in this example, comprises updates to play-while-away gaming. The play-while-away gaming enables a person to place wagers for a virtual wagering game machine wherein the person is not required to be present. The updates can indicate the amount of winnings, the amount of money remaining on the user account, etc. The overlaid media content in this example can entice users to eat at certain restaurants or shop at certain stores that are providing this functionality.

Figure 10:
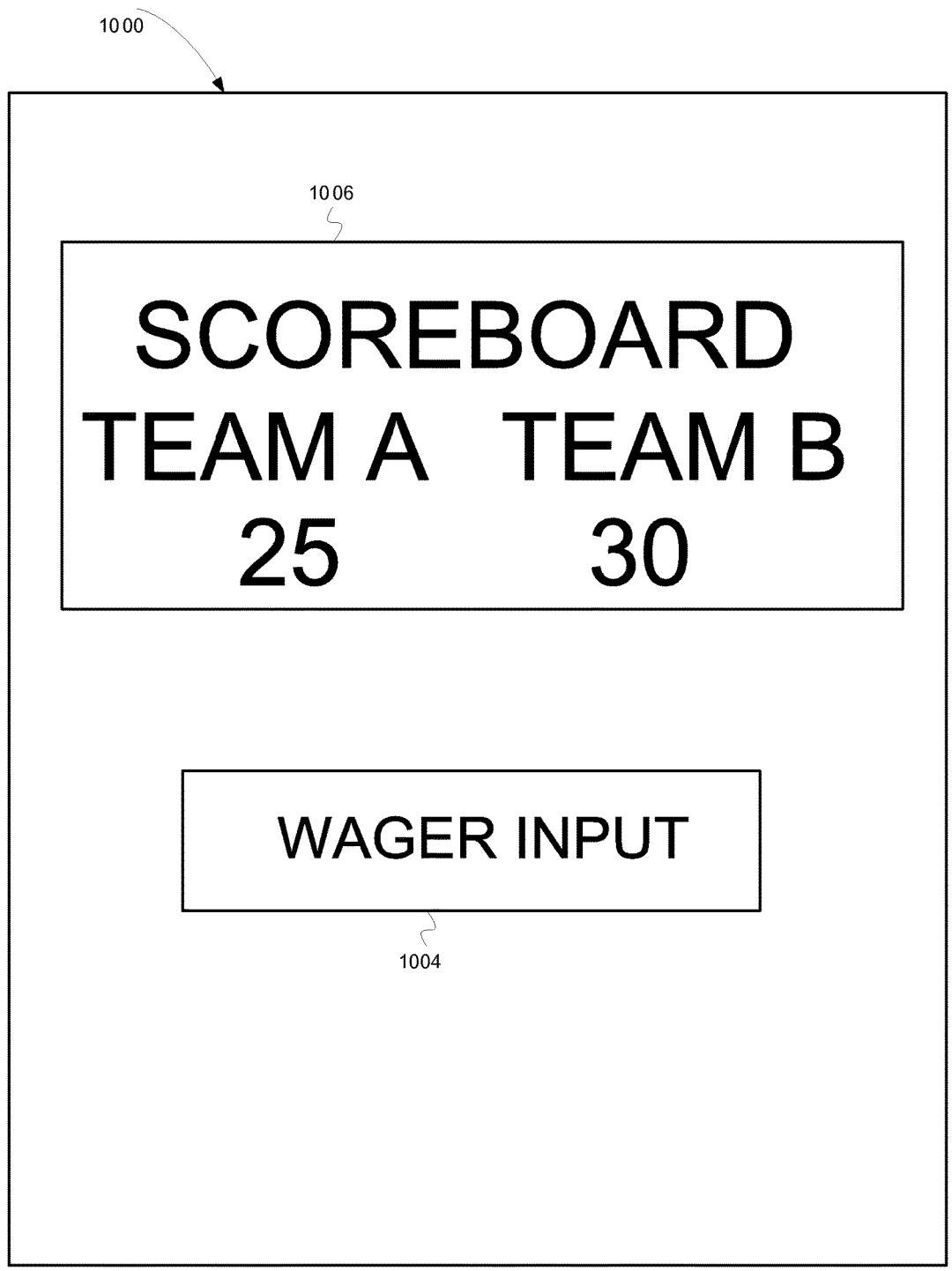
FIG. 10 is a screenshot of a display of a mobile device providing augmented reality that enables wagering of a sporting event while a user is at the sporting event, according to some example embodiments.

FIG. 10 is a mobile device's screenshot providing augmented reality that enables wagering on a sporting event while a user is at the sporting event, according to some example embodiments. FIG. 10 includes a screen shot 1000. In this example, the captured media content includes an image of a scoreboard 1006 at a sporting event. The captured media content can be other objects for a sporting event (e.g., logo on the field or floor, a sign for the stadium or park, etc.). The overlay imagery in this example comprises a graphic user interface 1004 to enable the user to wager on this particular sporting event (e.g., winner, athlete scoring the most points in the event, etc.).

Figure 11:
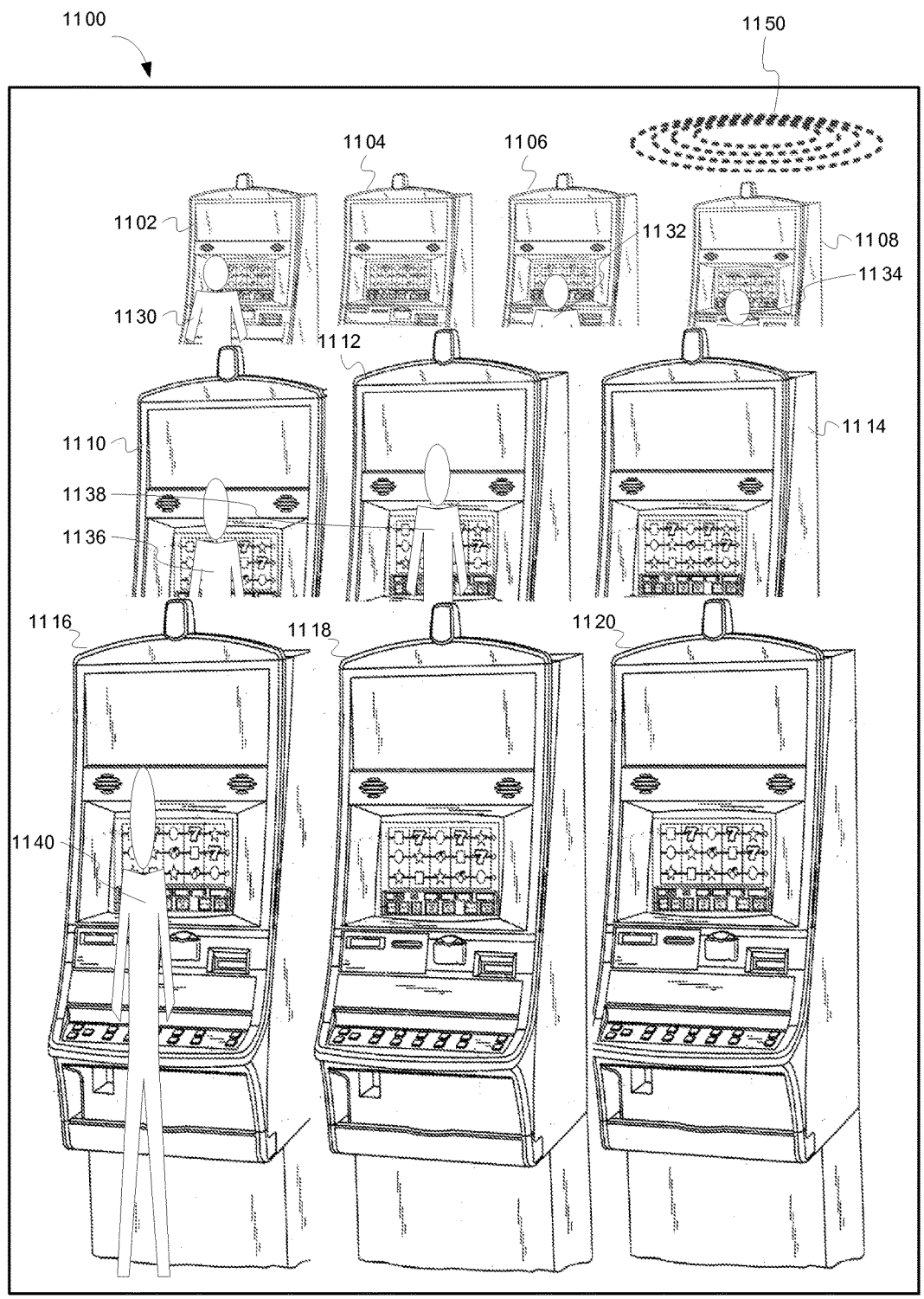
FIG. 11 is a screenshot of a display of a mobile device providing augmented reality that enables the locating of person(s) in a wagering game establishment, according to some example embodiments.

FIG. 11 is a screenshot of a mobile device's display providing augmented reality that enables the locating of person(s) in a wagering game establishment, according to some example embodiments. FIG. 11 includes a screenshot 1100 that provides a view of a gaming floor of a wagering game establishment. The screenshot can comprise an image or video. The screenshot 1100 includes wagering game machines 1102-1120. Persons 1130, 1132, 1134, 1136, 1138 and 1140 are playing wagering game machines 1102, 1106, 1108, 1110, 1112 and 1116, respectively. The overlay imagery 1150 in this example includes a light 1150 shown above the wagering game machine 1108. The light 1150 indicates that the person 1134 is a person of interest to the user of the mobile device. For example, the user could input (at the mobile device) a person they are attempting to locate in the wagering game establishment. Alternatively or in addition, a player's player account can list persons of interest (e.g., family members or friends), where the account is accessible by the mobile device. In such an application, for all listed persons playing on wagering game machines, the augmented reality display can show lights above their wagering game machine to assist the mobile device user in locating such persons.

FIGS. 3-11 are various screenshots, according to some example embodiments. The screenshots can include still images, motion video, animations, graphics, or any other indicia presentable on a display device. Moreover, any of the embodiments described vis-à-vis mobile devices can be implemented in non-mobile technologies, such as desktop computers, wagering game machines, etc. In some instances, stationary devices can utilize remote media capture devices to capture objects about which overlay imagery is presented.

Although the examples in FIGS. 3-11 utilize optical devices to capture media, other embodiments can use audio devices to capture media. For example, a mobile device can include an audio capture device that captures ambient sounds, or receives wirelessly receives audio content. In response to the captured audio content, the mobile device can present imagery associated with the captured audio content. For example, if the mobile device captures audio of a jackpot celebration (e.g., ringing bells, celebratory music, etc.), the mobile device can present imagery indicating the jackpot amount, time between jackpots, etc. Accordingly, the overlay module can process non-optical media and present imagery associated with such non-optical media.

Example Operations

This section describes operations associated with some example embodiments. In the discussion below, the flow diagrams are described with reference to the block diagrams presented above. However, in some example embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

The section describes FIGS. 12-15. The discussion of FIG. 12 describes operations for performing augmented reality related to wagering game activity wherein the mobile device can be either local or remote to a wagering game establishment. The discussion of FIG. 13 describes operations for augmented reality on a mobile device that is accessible by an operator at a wagering game establishment. The discussion of FIGS. 14-15 describes operations for augmented reality for wagering game activity wherein the mobile device is remote to a wagering game establishment.

Figure 12:
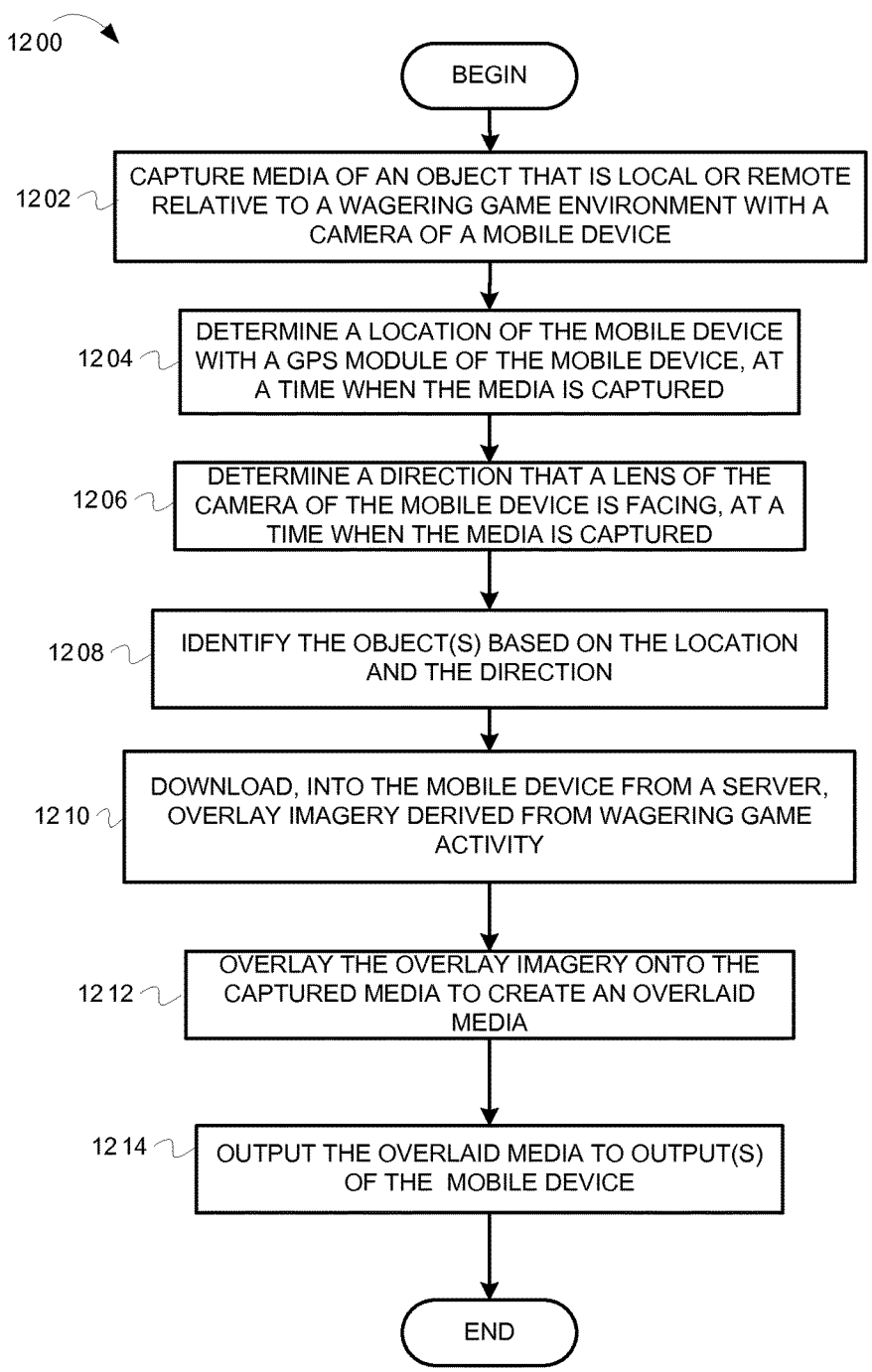
FIG. 12 is a flowchart of operations for augmented reality related to wagering game activity (local or remote relative to a wagering game establishment), according to some example embodiments.

FIG. 12 is a flowchart of operations for augmented reality related to wagering game activity (local or remote relative to a wagering game establishment), according to some example embodiments. A flow diagram 1200 includes operations that, in some example embodiments, are performed by components of a mobile device. The flow diagram 1200 is described with reference to the mobile device 206 of FIG. 2. The operations of the flow diagram 1200 begin at block 1202.

At block 1202, the camera 209 of the mobile device 206 captures media content of an object that is local or remote to a wagering game environment. For example, the camera 209 can capture still images, video, or a combination thereof. Examples of objects being captured at a wagering game establishment include a wagering game machine, multiple wagering game machines, a part of the floor (including wagering game machines), various signage, etc. These objects can also include wagering game players playing at the wagering game machines. Examples of objects being captured outside wagering game establishments include signage at mercantile establishment (e.g., brick-and-mortar restaurants, stores, etc.), signage at a sporting event, etc. Operations continue at block 1204.

At block 1204, the GPS module 212 of mobile device 206 determines a location of the mobile device 206 at a time when the media content is captured by the camera 209. The GPS module 212 receives signals from a number of satellites orbiting around the Earth. The signals include data that indicates the satellite position and current time. Based on the satellite position and time when signals were sent from multiple satellites, the GPS module 212 can use trilateration to determine its location on the Earth. In some example embodiments, differential GPS is used, wherein the area has already been surveyed using a GPS. The GPS module 212 could determine the location of the mobile device 206 within that area. The overlay module 236 can then adjust the location captured by the GPS module 212 with the location data from the previous survey. Alternative or in addition to GPS locating, the location can be determined using a cellular infrastructure to triangulate the location of the mobile device. The overlay module 236 stores this location in the storage unit 230 and/or main memory 228 for subsequent processing. Operations continue at block 1206.

At block 1206, the compass 214 of the mobile device 206 determines a direction that a lens of the camera 209 of the mobile device 206 is facing at a time when the media content is captured by the camera 209. The overlay module 236 stores this direction in the storage unit 230 and/or main memory 228 for subsequent processing. Alternatively or in addition to determining the position and location of the mobile device 206 using GPS and a compass, the overlay module 236 can make this determination based on embedded watermarks in various wagering game displays, signage in the wagering game establishment, etc. (as described above). Operations continue at block 1208.

At block 1208, the overlay module 236 identifies the object(s) based on the location of the mobile device 206 and the direction that the lens of the camera 209 is facing at the time when the media content is captured by the camera 209. The overlay module 236 can determine the location of objects in the view of the lens of the camera 209 based on the location of the mobile device 206 and the direction of the lens. In some example embodiments, the overlay module 236 can transmit its location and direction to a backend server. The backend server can then return the identification of the viewable objects to the overlay module 236. In particular, the backend server stores the location of objects in the area (e.g., wagering game establishment). For example, the locations of the wagering game machines, structural aspects of the wagering game establishment (e.g., structural posts, walls, etc.), etc. are stored by the backend server. Accordingly, the backend server can return the identification of the objects in the viewable area (e.g., wagering game machine). In addition, in some embodiments, image recognition can used to assist in determination of objects in the viewable area. Similarly, various objects remote from a wagering game establishment can be identified based on the location and direction of the mobile device. For example, if a user of a mobile device is located in a certain seat at a sporting event, the overlay module 236 can determine that the lens of the camera is facing the scoreboard based on the known location of the scoreboard relative to the location and direction of the mobile device. Operations continue at block 1210.

At block 1210, the overlay module 236 downloads, into the mobile device 206 from a backend server, overlay imagery derived from wagering game activity. Various overlay imagery can be downloaded (as described above). For example, if the captured object comprises a wagering game machine, the overlay imagery can include data regarding past wagering game activity for the particular wagering game machine or for the particular theme currently executing on the wagering game machine. Such past wagering game activity can identify when the last time a jackpot was hit for this wagering game machine or theme thereon, or the frequency of hitting a jackpot for this wagering game machine or theme thereon. The overlay imagery can also identify other similar types of wagering game machines to play based on the specific wagering game machine. In another example, the overlay imagery can provide media content of a past wagering game activity of the user associated with the mobile device. For instance, the past wagering game activity of the user can be previous big wins, previous jackpots, previous trophies, points need to reach the next level of a level-based game play, etc. In another example, the overlay imagery can provide information regarding the status of a current community activity for wagering game players across a number of wagering game machines.

In another application, the overlay imagery can enable side betting relative to the wagering game machine whose image is captured. Accordingly, the overlay imagery enables the user of the mobile device 104 to input bets relative to the game currently being played on the wagering game machine. In addition to or as an alternative to side betting, the overlay imagery can provide a virtual instance of the game being played on the wagering game machine whose image is captured. Accordingly, the user can conduct wagering game activity of a different instance of the game being played on the wagering game machine whose image is captured. In another application, the overlay imagery can provide instructions for strategy for the wagering game being played at the wagering game machine. The overlay imagery can also be a language translation of the wagering game machine. The translation can be for the static images of the wagering game machine (title, instructions, etc.), the dynamic, real time images (the spin results) being produced in response to the wagering game activity, or a combination thereof.

In another application, the overlay imagery can provide "play-while-away" updates while the user is away from the wagering game establishment. This overlay imagery can be in response to capturing an image of various signage at mercantile establishment (e.g., restaurants and stores). In another application, the user of the mobile device 104 can wager bets for a sporting event while the user is at the sporting event. For example, if the captured image comprises the scoreboard at the sporting event, the mobile device 104 can then output an overlay imagery that enables the user to input one or more bets relative to the sporting event (e.g., winner, athlete scoring the most points in the event, etc.).

In another application, the overlay imagery can enable a user of the mobile device 104 to determine the location of others persons in the wagering game establishment. In particular, the image captured can include a video wherein a sweeping of the wagering game establishment is captured. The overlay imagery could include light, color, etc. to identify the location of certain persons associated with the user of the mobile device 104. Such persons can include friends, family members, etc. can consent to such identification.

In another application, the overlay imagery can provide hidden content that can only be seen via the mobile device 104 while viewing the wagering game machine. The hidden content can be interactive or passive. An interactive example can allow the user of the mobile device 104 to pick a bonus for the wagering game machine. A passive example can allow the user of the mobile device 104 to see the progressive meters for a progressive jackpot associated with the wagering game machine. In another example, the hidden content can be potential prizes available on the local wagering game machine (such as a local progressive jackpot value).

In some example embodiments, the user of the mobile device 104 can be an operator at the wagering game establishment. Accordingly, the overlay imagery can include statistics about the wagering game machine. For example, the statistics can include the amount of wagering game activity or inactivity, the payouts, the number and types of wagering game players, etc. for a given time period (e.g., the current day, last hour, etc.). Also, for operator usage, the overlay imagery can include an identification of the wagering game player current playing at the wagering game machine. The overlay imagery can include whether the amount of money the player has spent for a given time period, if the player is having a winning trend or losing trend currently at the wagering game player. For example if the player is a "big spender" that is currently in a losing trend, the overlay imagery can be a picture of a whale with a red down arrow. In such a situation, the operator can provide free "comps" for the player. For example, the operator can remotely communicate with a backend server to issue a number of credits to the account for the wagering game player. Alternatively or in addition, the operator can issue to their account an extra night stay at the hotel, free dinner, etc. Also for operator usage, the captured image can be a part of the floor of the wagering game establishment. Accordingly, the overlay imagery can include video or data of the traffic patterns for that part of the floor. Returning to the flow diagram 1200, operations continue at block 1212.

At block 1212, the overlay module 236 composites the overlay imagery onto the captured media content to create a composited media content. The composited media content can be various combinations of media content. For example, a still imagery (e.g., text, graphics, etc.) can be composited onto a video or a still image. In another example, video imagery can be composited onto a video or still image. In another example, a graphical user interface can be composited onto a video or still image to allow the user to enter information. While the media content has been described relative to visual media content, in some other embodiments, audio media content can be included as either or both the captured media content or part of the overlay imagery. For example, alternative to or in addition to a text message, an audio message can be played at speakers of the mobile device. Operations continue at block 1214.

At block 1214, the overlay module 236 outputs the overlaid media content to an output of the mobile device. For example, the overlay module 236 can output the visual overlaid media content to the display 210 and audible overlaid media content to the speaker 207. Alternatively or in addition, the overlay module 236 can output the overlaid media content to other devices. For example, the media content can be output to a display or speaker in an automobile, a television, a computer screen, etc. This output can occur through a wired or wireless communications between the mobile device 206 and the other device. The operations of the flow diagram 1200 are complete.

Figure 13:
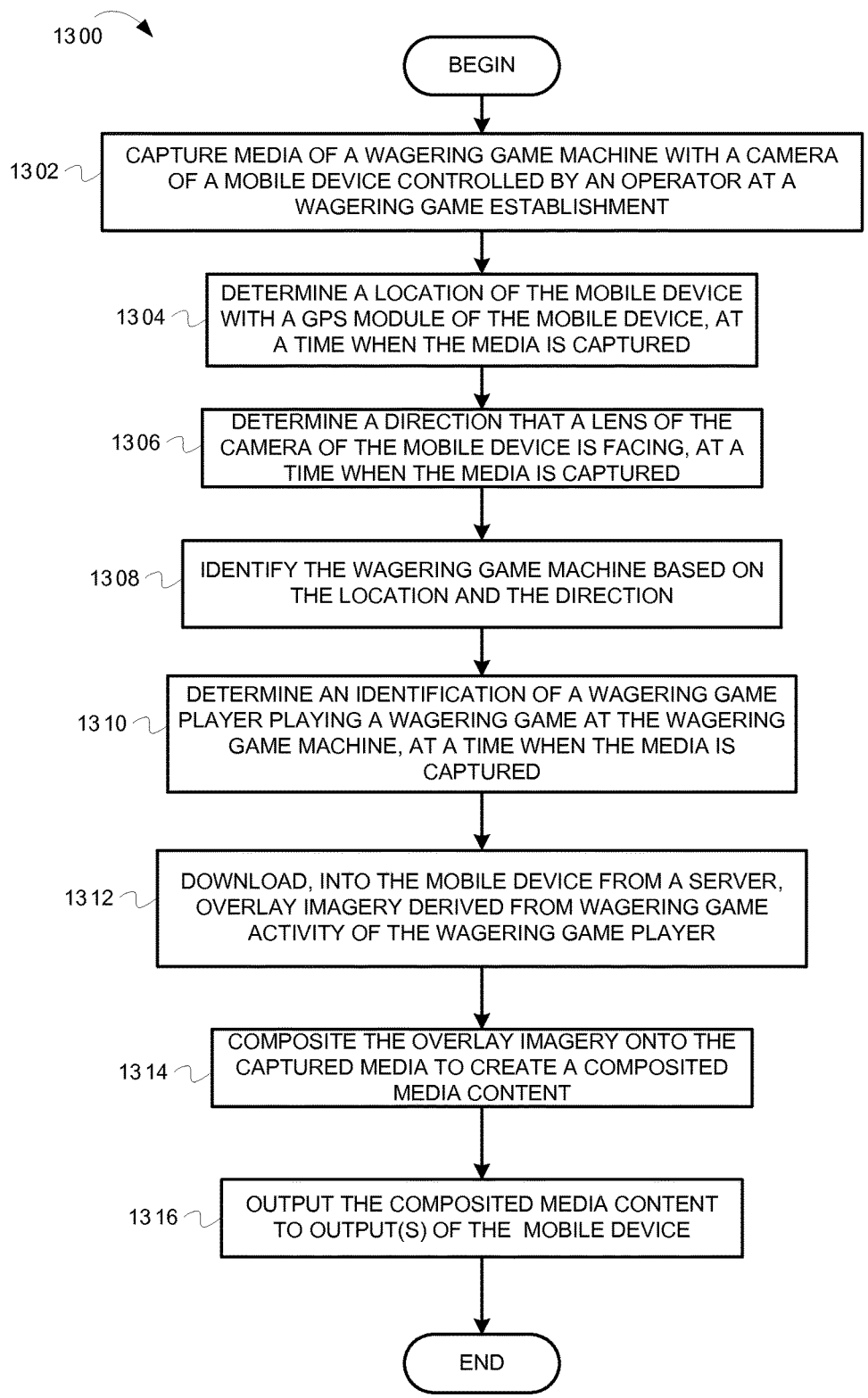
FIG. 13 is a flowchart of operations for augmented reality related to a wagering game machine at a wagering game establishment and accessible by an operator at the wagering game establishment, according to some example embodiments.

FIG. 13 is a flowchart of operations for augmented reality related to a wagering game machine at a wagering game establishment and accessible by an operator at the wagering game establishment, according to some example embodiments. This application of augmented reality enables an operator at the wagering game establishment to monitor wagering game activity at the wagering game establishment while walking the floor therein. In FIG. 13, in some example embodiments, a wagering game player is playing a wagering game at the wagering game machine when media content is captured of the wagering game machine. Alternatively, media content can be captured of a wagering game machine where a wagering game player is not playing. A flow diagram 1300 includes operations that, in some example embodiments, are performed by components of a mobile device. The flow diagram 1300 is described with reference to the mobile device 206 of FIG. 2. The operations of the flow diagram 1300 begin at block 1302.

At block 1302, the camera 209 of the mobile device 206 captures media content of a wagering game machine, wherein the mobile device 206 is controlled by an operator at a wagering game establishment. For example, the camera 209 can capture still images, video or a combination thereof. Operations continue at block 1304.

At block 1304, the GPS module 212 of mobile device 206 determines a location of the mobile device 206 at a time when the media content is captured by the camera 209. Alternative or in addition to GPS locating, the location can be determined using a cellular infrastructure to triangulate the location of the mobile device. The overlay module 236 stores this location in the storage unit 230 and/or main memory 228 for subsequent processing. Operations continue at block 1306.

At block 1306, the compass 214 of the mobile device 206 determines a direction that a lens of the camera 209 of the mobile device 206 is facing at a time when the media content is captured by the camera 209. The overlay module 236 stores this direction in the storage unit 230 and/or main memory 228 for subsequent processing. Alternatively or in addition to determining the position and location of the mobile device 206 using GPS and a compass, the overlay module 236 can make this determination based on embedded watermarks in various wagering game displays, signage in the wagering game establishment, etc. (as described above). Operations continue at block 1308.

At block 1308, the overlay module 236 identifies the wagering game machine based on the location of the mobile device 206 and the direction that the lens of the camera 209 is facing at the time when the media content is captured by the camera 209 (see description at block 1208 of FIG. 12 above). Operations continue at block 1310.

At block 1310, the overlay module 236 determines an identification of a wagering game player playing a wagering game at the wagering game machine, at a time when the media content is captured. In some example embodiments, this identification of the player is provided by a backend server. In particular, the backend server tracks which players are playing on which wagering game machine at any given time based on player tracking In some example embodiments, the player tracking relies on players logging into their accounts (e.g., inserting their player tracking cards) while playing at the wagering game machine. Accordingly, if player tracking is unavailable, the player identification cannot be made. Alternatively or in addition to obtaining the identification from the backend server, the identification can be made using watermarks that are integrated into a display of the wagering game machine. The watermarks can be supplied by the backend server and/or by the wagering game machine and provides identification of the player. The watermarks are captured as part of the captured media content. The overlay module 236 can then locate the watermarks in the image and identify the player based on the watermarks. Accordingly, a different watermark provides a unique identification of a wagering game player. Operations continue at block 1312.

At block 1312, the overlay module 236 downloads, into the mobile device 206 from a backend server, overlay imagery derived from wagering game activity of the wagering game player. The wagering game activity can include any trackable measure (e.g., time of play, the amount of money spent on this wagering game machine or at the wagering game establishment for a given time period (e.g., last 24 hours), whether the player is having a winning trend or losing trend, etc.). Such data enables the operator to determine statistics of individual players that are playing, while the operator is walking around the wagering game establishment. In such embodiments, the overlay imagery can relate to statistics about the particular wagering game machine or particular theme current executing on the wagering game machine. For example, the statistics can identify the amount of time the wagering game machine is being played, types of players (e.g., big spenders) playing the wagering game machine, etc. In some example embodiments, a player is not playing a wagering game at the wagering game machine or cannot be tracked (as described above). Accordingly, the wagering game activity of the wagering game player playing at the wagering game machine is not provided. Operations continue at block 1314.

At block 1314, the overlay module 236 composites the overlay imagery onto the captured media content to create a composited media content. The composited media content can be various combinations of media content (as described above). Operations continue at block 1316.

At block 1316, the overlay module 236 outputs the overlaid media content to an output of the mobile device. For example, the overlay module 236 can output the visual overlaid media content to the display 210 and audible overlaid media content to the speaker 207. The operations of the flow diagram 1300 are complete.

Some other example embodiments enable an operator of a wagering game establishment to receive wagering game activity of a wagering game player. In particular, the operator can capture media content (e.g., screenshot) of the tracking card of the wagering game player. Optical character recognition processing can then locate and determine a watermark or tag in the captured media content. The watermark or tag can then be decoded to provide identification of the wagering game player. This processing can be performed by the overlay module 236 or by operations at the backend server. Then similar to the operations described in block 1312, the overlay module 236 downloads, into the mobile device 206 from a backend server, overlay imagery derived from wagering game activity of the wagering game player based on this identification provided by the watermark or tag.

Figure 14:
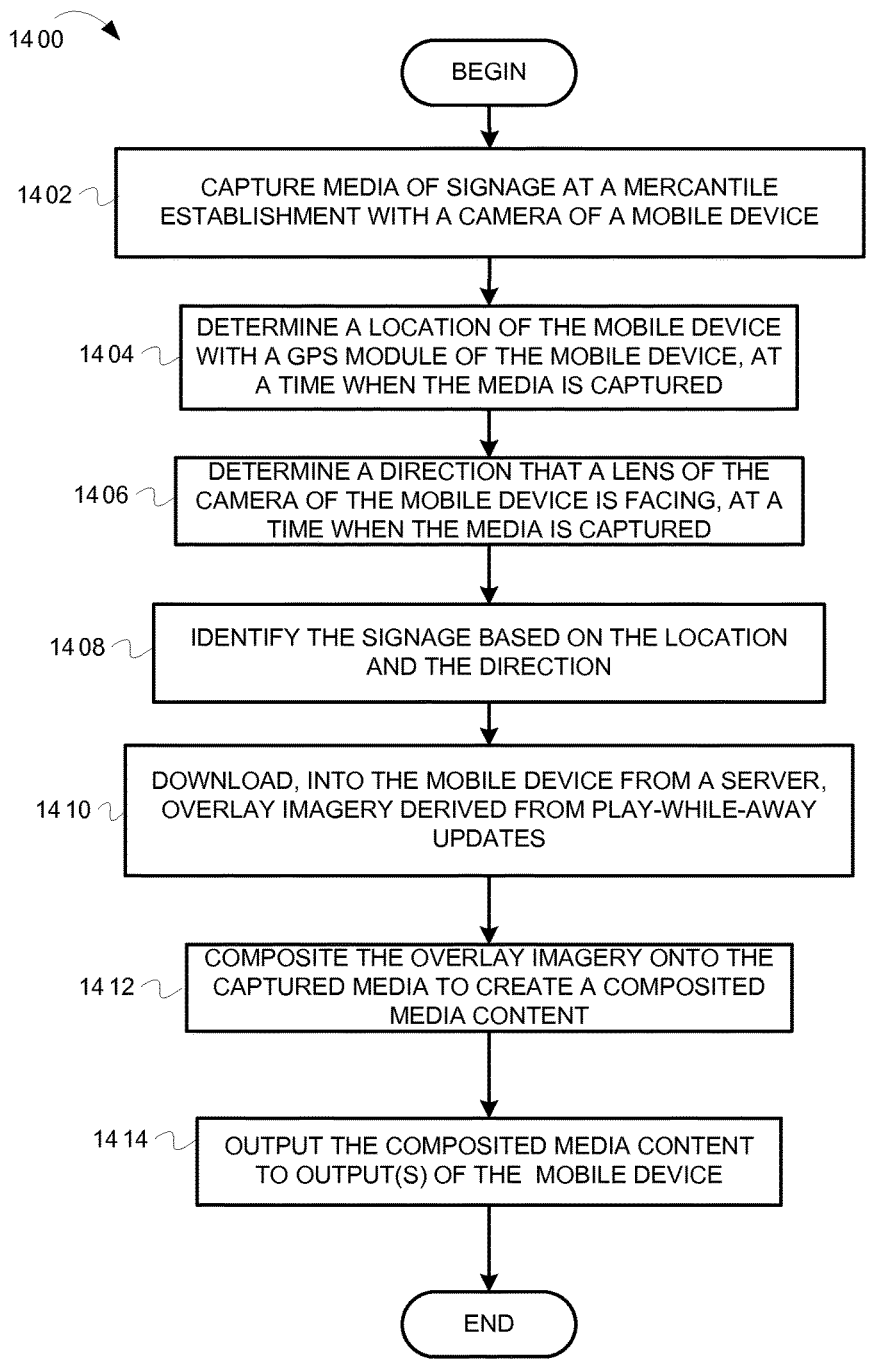
FIG. 14 is a flowchart of operations for augmented reality related to play-while-away updates for a wagering game activity, according to some example embodiments.

An application for augmented reality (relative to wagering game activity) that is remote from a wagering game establishment includes play-while-away updates. This application of augmented reality enables a user of the mobile device to monitor their play-while-away wagering game activity. As described above, such gaming enables a wagering game player to wager while the player is not present at the wagering game establishment (such as at a virtual wagering game machine). As described below, the mobile device can provide updates to this "playing while away" gaming for a player, if the player captures media content of certain signage at certain locations. For example, if the captured image comprises a corporate logo for a particular restaurant or store, the mobile device can then output overlay imagery onto the corporate logo that provides these updates to "playing while away" gaming (see FIG. 9 described above). This application can encourage the user of mobile devices to dine at certain restaurants or shop a certain stores. FIG. 14 is a flowchart of operations for augmented reality related to play-while-away updates for a wagering game activity, according to some example embodiments. A flow diagram 1400 includes operations that, in some example embodiments, are performed by components of a mobile device. The flow diagram 1400 is described with reference to the mobile device 206 of FIG. 2. The operations of the flow diagram 1400 begin at block 1402.

At block 1402, the camera 209 of the mobile device 206 captures media content of signage at a mercantile establishment (e.g., restaurant, store, etc.). For example, the camera 209 can capture still images, video or a combination thereof. Operations continue at block 1404.

At block 1404, the GPS module 212 of mobile device 206 determines a location of the mobile device 206 at a time when the media content is captured by the camera 209. Alternative or in addition to GPS locating, the location can be determined using a cellular infrastructure to triangulate the location of the mobile device. The overlay module 236 stores this location in the storage unit 230 and/or main memory 228 for subsequent processing. Operations continue at block 1406.

At block 1406, the compass 214 of the mobile device 206 determines a direction that a lens of the camera 209 of the mobile device 206 is facing at a time when the media content is captured by the camera 209. The overlay module 236 stores this direction in the storage unit 230 and/or main memory 228 for subsequent processing. Alternatively or in addition to determining the position and location of the mobile device 206 using GPS and a compass, the overlay module 236 can make this determination based on embedded watermarks in various wagering game displays, signage in the wagering game establishment, etc. (as described above). Operations continue at block 1408.

At block 1408, the overlay module 236 identifies the signage based on the location of the mobile device 206 and the direction that the lens of the camera 209 is facing at the time when the media content is captured by the camera 209 (see description at block 1208 of FIG. 12 above). Operations continue at block 1410.

At block 1410, the overlay module 236 downloads, into the mobile device 206 from a backend server, overlay imagery derived from play-while-away updates. The updates can indicate the amount of winnings, the amount of money remaining on the user account, etc. Operations continue at block 1412.

At block 1412, the overlay module 236 composites the overlay imagery onto the captured media content to create a composited media content. The composited media content can be various combinations of media content (as described above). Operations continue at block 1414.

At block 1414, the overlay module 236 outputs the overlaid media content to an output of the mobile device. For example, the overlay module 236 can output the visual overlaid media content to the display 210 and audible overlaid media content to the speaker 207. The operations of the flow diagram 1400 are complete.

Figure 15:
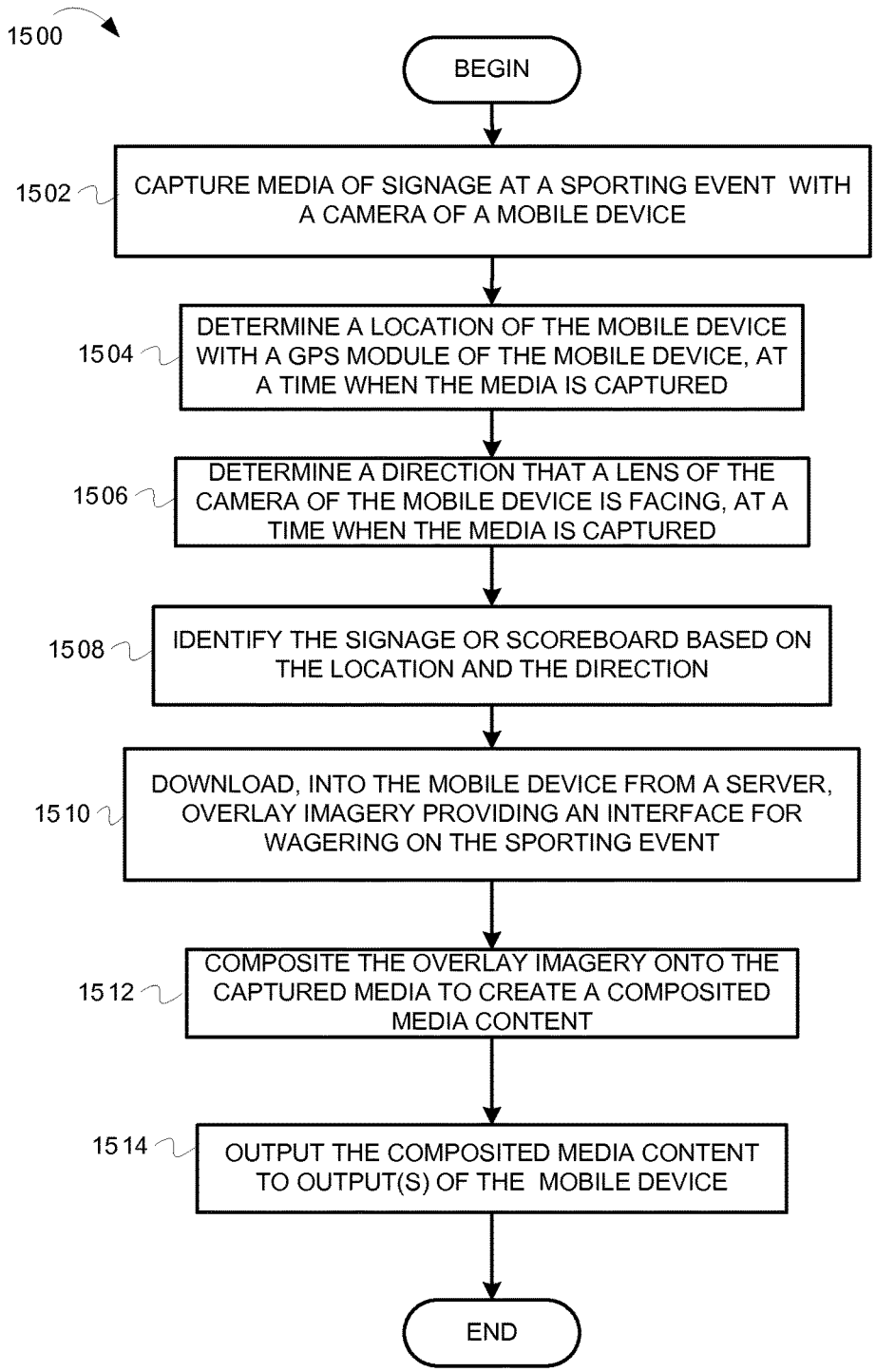
FIG. 15 is a flowchart of operations for augmented reality related to wagering on sporting events while at a sporting event, according to some example embodiments.

Another application for augmented reality relative to wagering game activity is to enable wagering on sporting events. In particular, FIG. 15 is a flowchart of operations for augmented reality related to wagering on sporting events while at a sporting event, according to some example embodiments. A flow diagram 1500 includes operations that, in some example embodiments, are performed by components of a mobile device. The flow diagram 1500 is described with reference to the mobile device 206 of FIG. 2. The operations of the flow diagram 1500 begin at block 1502.

At block 1502, the camera 209 of the mobile device 206 captures media content of signage at a sporting event. For example, the camera 209 can capture still images, video or a combination thereof. The signage can be the scoreboard, a logo on the playing field, a sign that includes the name of the field or stadium, etc. (see FIG. 10 described above). Operations continue at block 1504.

At block 1504, the GPS module 212 of mobile device 206 determines a location of the mobile device 206 at a time when the media content is captured by the camera 209. Alternative or in addition to GPS locating, the location can be determined using a cellular infrastructure to triangulate the location of the mobile device. The overlay module 236 stores this location in the storage unit 230 and/or main memory 228 for subsequent processing. Operations continue at block 1506.

At block 1506, the compass 214 of the mobile device 206 determines a direction that a lens of the camera 209 of the mobile device 206 is facing at a time when the media content is captured by the camera 209. The overlay module 236 stores this direction in the storage unit 230 and/or main memory 228 for subsequent processing. Alternatively or in addition to determining the position and location of the mobile device 206 using GPS and a compass, the overlay module 236 can make this determination based on embedded watermarks in various wagering game displays, signage in the wagering game establishment, etc. (as described above). Operations continue at block 1508.

At block 1508, the overlay module 236 identifies the signage based on the location of the mobile device 206 and the direction that the lens of the camera 209 is facing at the time when the media content is captured by the camera 209 (see description at block 1208 of FIG. 12 above). Operations continue at block 1510.

At block 1510, the overlay module 236 downloads, into the mobile device 206 from a backend server, overlay imagery that provide an interface to allow the user of the mobile device 206 to wager a bet on the sporting event. The interface can allow selection of a number of different types of wagers. Accordingly, a first overlay imagery can enable the user to select a type of wager (e.g., winner, player scoring the most points, etc.). Once the user selects the type of wager, the overlay module 236 can transmit this selection to the backend server. In response, the backend server can transmit another overlay imagery to allow the user to wager on that particular type of wager. The overlay module 236 can receive this additional overlay imagery. Accordingly, multiple downloads can be received from the backend server into the mobile device 206. Operations continue at block 1512.

At block 1512, the overlay module 236 composites the overlay imagery onto the captured media content to create a composited media content. The composited media content can be various combinations of media content (as described above). In this example, the user of the mobile device 206 can input data into the overlay imagery for selection of the type of wager, for placing of the wagering, etc. After receipt, the overlay module 236 can transmit this input from the user of the mobile device 206 to the backend server. The backend server can enter the wager or transmit the wager to a different server that enters the wager for the user. In some example embodiments, the backend server transmits a confirmation back to the mobile device 206. For example, the confirmation can be a message (e.g., an email, text, etc.) back to the mobile device 206, additional overlay imagery, etc. Operations continue at block 1514.

At block 1514, the overlay module 236 outputs the composited media content to an output of the mobile device. For example, the overlay module 236 can output the visual composited media content to the display 210 and audible composited media content to the speaker 207. The operations of the flow diagram 1500 are complete.

Operating Environment

This section describes an example operating environment and presents structural aspects of some embodiments. This section includes discussion about wagering game machine architectures and wagering game networks.

Wagering Game Machine Architectures

Figure 16:
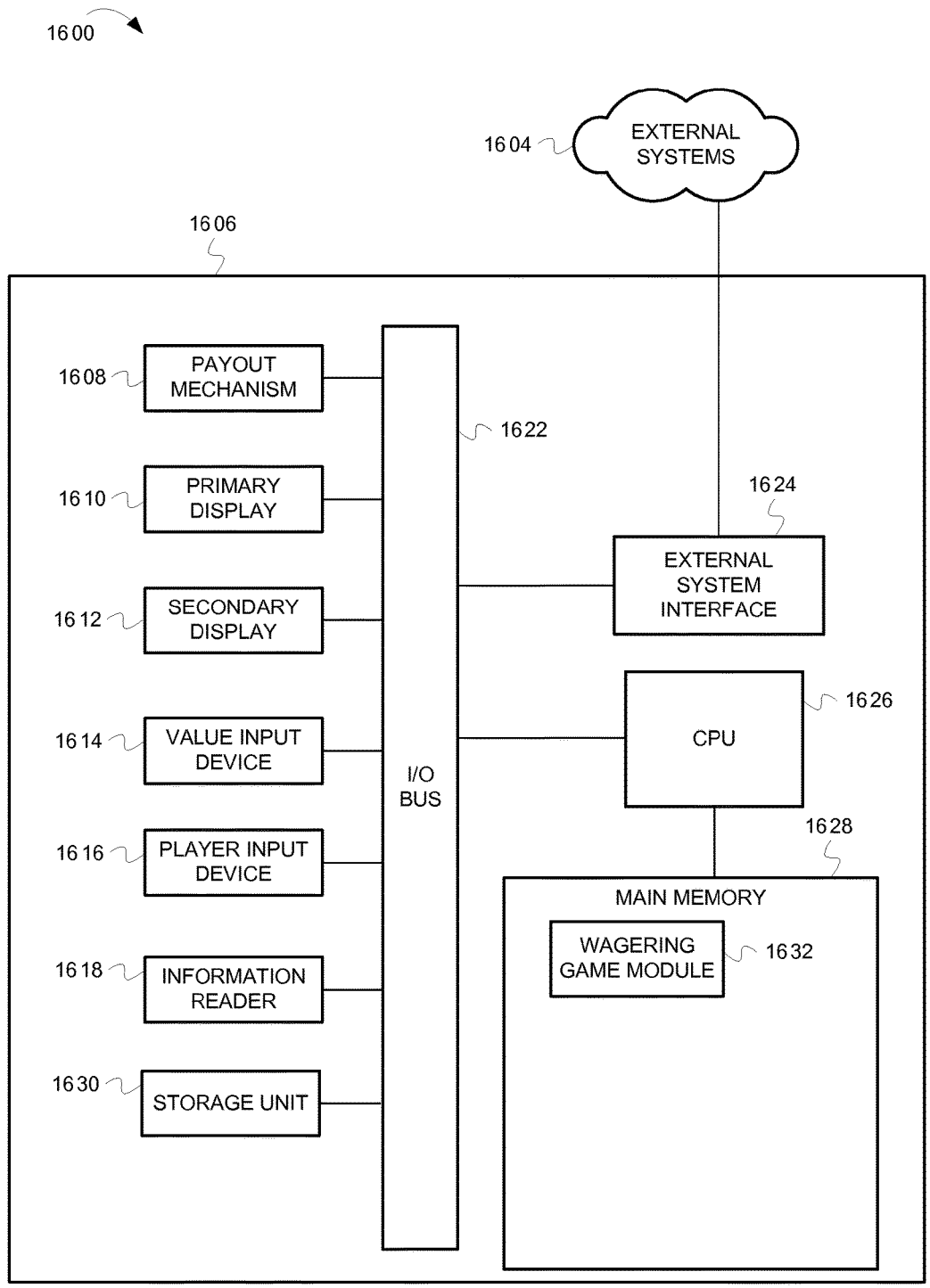
FIG. 16 is a block diagram illustrating a wagering game machine architecture, according to some example embodiments.

FIG. 16 is a block diagram illustrating a wagering game machine architecture, according to some example embodiments. As shown in FIG. 16, the wagering game machine architecture 1600 includes a wagering game machine 1606, which includes a central processing unit (CPU) 1626 connected to main memory 1628. The CPU 1626 can include any suitable processor, such as an Intel® Pentium processor, Intel® Core 2 Duo processor, AMD Opteron™ processor, or UltraSPARC processor. The main memory 1628 includes a wagering game unit 1632. In one embodiment, the wagering game unit 1632 can present wagering games, such as video poker, video black jack, video slots, video lottery, etc., in whole or part.

The CPU 1626 is also connected to an input/output (I/O) bus 1622, which can include any suitable bus technologies, such as an AGTL+ frontside bus and a PCI backside bus. The I/O bus 1622 is connected to a payout mechanism 1608, primary display 1610, secondary display 1612, value input device 1614, player input device 1616, information reader 1618, and storage unit 1630. The player input device 1616 can include the value input device 1614 to the extent the player input device 1616 is used to place wagers. The I/O bus 1622 is also connected to an external system interface 1624, which is connected to external systems 1604 (e.g., wagering game networks).

In one embodiment, the wagering game machine 1606 can include additional peripheral devices and/or more than one of each component shown in FIG. 16. For example, in one embodiment, the wagering game machine 1606 can include multiple external system interfaces 1624 and/or multiple CPUs 1626. In one embodiment, any of the components can be integrated or subdivided.

Any component of the architecture 1600 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 16 describes an example wagering game machine architecture, this section continues with a discussion wagering game networks.

Wagering Game Networks

Figure 17:
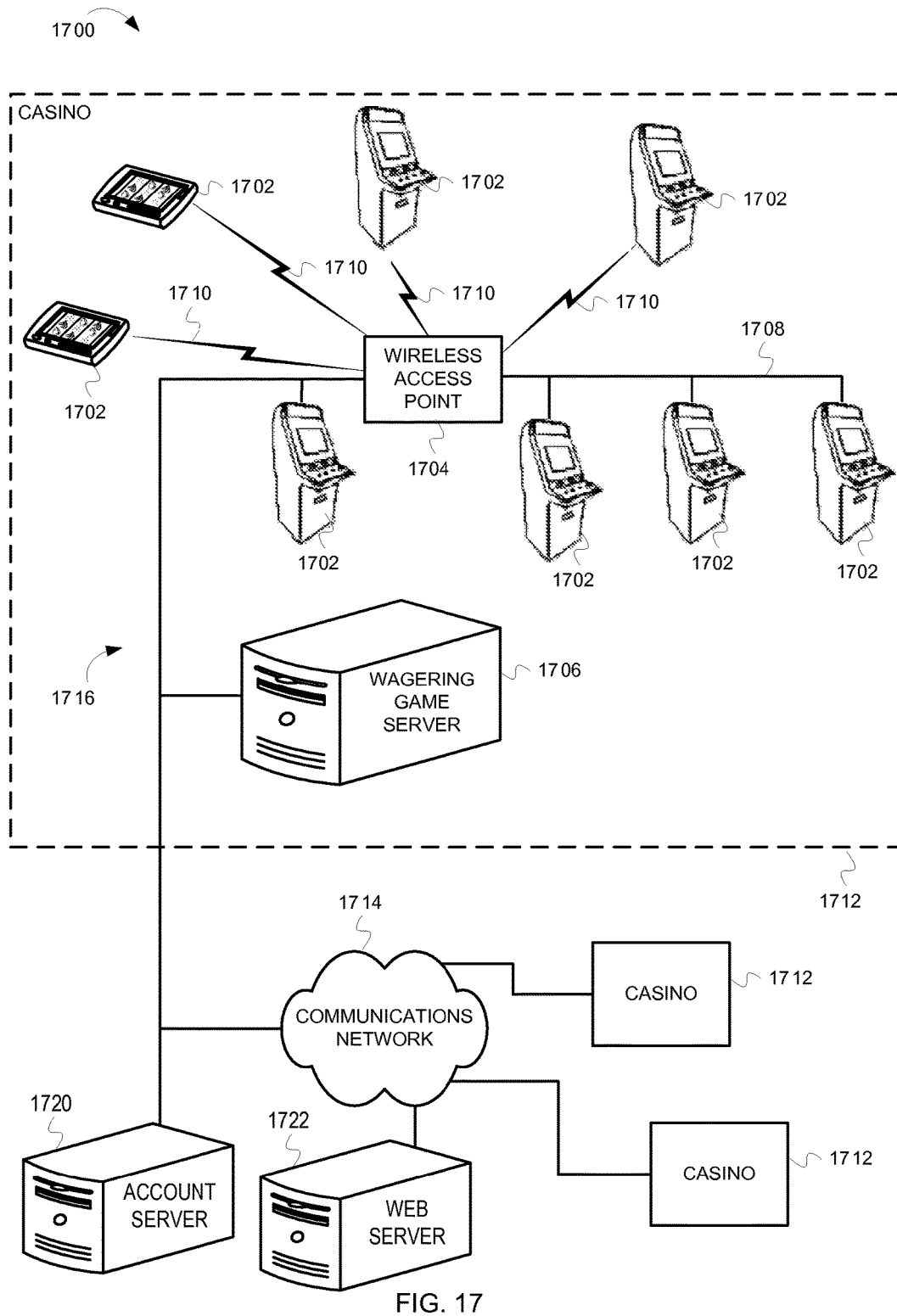
FIG. 17 is a block diagram illustrating a wagering game network, according to some example embodiments.

FIG. 17 is a block diagram illustrating a wagering game network 1700, according to some example embodiments. As shown in FIG. 17, the wagering game network 1700 includes a plurality of casinos 1712 connected to a communications network 1714.

Each casino 1712 includes a local area network 1716, which includes an access point 1704, a wagering game server 1706, and wagering game machines 1702. The access point 1704 provides wireless communication links 1710 and wired communication links 1708. The wired and wireless communication links can employ any suitable connection technology, such as Bluetooth, 802.11, Ethernet, public switched telephone networks, SONET, etc. In some embodiments, the wagering game server 1706 can serve wagering games and distribute content to devices located in other casinos 1712 or at other locations on the communications network 1714.

The wagering game machines 1702 described herein can take any suitable form, such as floor standing models, handheld mobile units, bartop models, workstation-type console models, etc. Further, the wagering game machines 1702 can be primarily dedicated for use in conducting wagering games, or can include non-dedicated devices, such as mobile phones, personal digital assistants, personal computers, etc. In one embodiment, the wagering game network 1700 can include other network devices, such as accounting servers, wide area progressive servers, player tracking servers, and/or other devices suitable for use in connection with embodiments of the invention.

In some embodiments, wagering game machines 1702 and wagering game servers 1706 work together such that a wagering game machine 1702 can be operated as a thin, thick, or intermediate client. For example, one or more elements of game play may be controlled by the wagering game machine 1702 (client) or the wagering game server 1706 (server). Game play elements can include executable game code, lookup tables, configuration files, game outcome, audio or visual representations of the game, game assets or the like. In a thin-client example, the wagering game server 1706 can perform functions such as determining game outcome or managing assets, while the wagering game machine 1702 can present a graphical representation of such outcome or asset modification to the user (e.g., player). In a thick-client example, the wagering game machines 1702 can determine game outcomes and communicate the outcomes to the wagering game server 1706 for recording or managing a player's account.

In some embodiments, either the wagering game machines 1702 (client) or the wagering game server 1706 can provide functionality that is not directly related to game play. For example, account transactions and account rules may be managed centrally (e.g., by the wagering game server 1706) or locally (e.g., by the wagering game machine 1702). Other functionality not directly related to game play may include power management, presentation of advertising, software or firmware updates, system quality or security checks, etc.

Any of the wagering game network components (e.g., the wagering game machines 1702) can include hardware and machine-readable media including instructions for performing the operations described herein.

Example Wagering Game Machine

Figure 18:
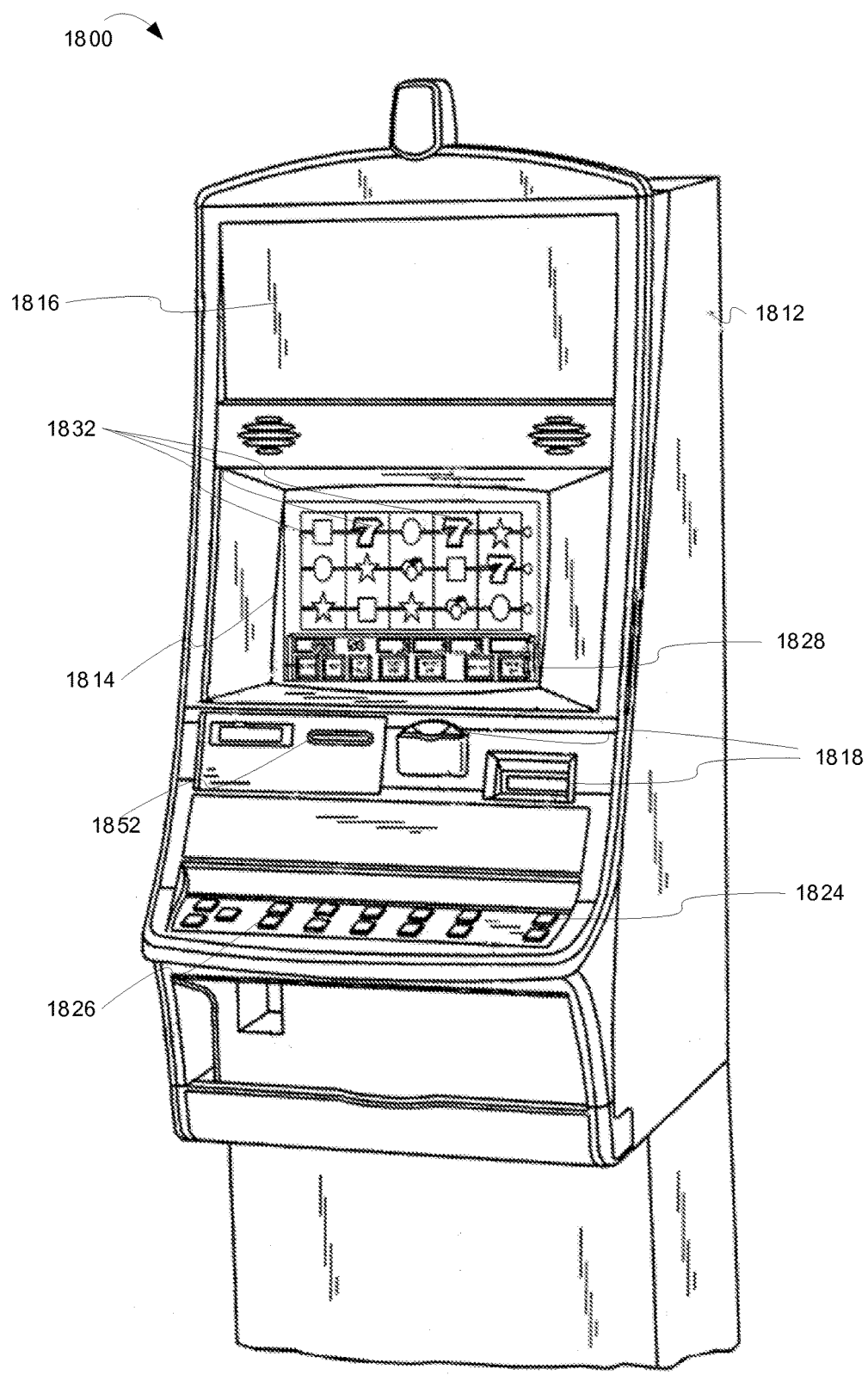
FIG. 18 is a perspective view of a wagering game machine, according to some example embodiments.

FIG. 18 is a perspective view of a wagering game machine, according to some example embodiments. Referring to FIG. 18, a wagering game machine 1800 is used in gaming establishments, such as casinos. According to embodiments, the wagering game machine 1800 can be any type of wagering game machine and can have varying structures and methods of operation. For example, the wagering game machine 1800 can be an electromechanical wagering game machine configured to play mechanical slots, or it can be an electronic wagering game machine configured to play video casino games, such as blackjack, slots, keno, poker, blackjack, roulette, etc.

The wagering game machine 1800 comprises a housing 1812 and includes input devices, including value input devices 1818 and a player input device 1824. For output, the wagering game machine 1800 includes a primary display 1814 for displaying information about a basic wagering game. The primary display 1814 can also display information about a bonus wagering game and a progressive wagering game. The wagering game machine 1800 also includes a secondary display 1816 for displaying wagering game events, wagering game outcomes, and/or signage information. While some components of the wagering game machine 1800 are described herein, numerous other elements can exist and can be used in any number or combination to create varying forms of the wagering game machine 1800.

The value input devices 1818 can take any suitable form and can be located on the front of the housing 1812. The value input devices 1818 can receive currency and/or credits inserted by a player. The value input devices 1818 can include coin acceptors for receiving coin currency and bill acceptors for receiving paper currency. Furthermore, the value input devices 1818 can include ticket readers or barcode scanners for reading information stored on vouchers, cards, or other tangible portable storage devices. The vouchers or cards can authorize access to central accounts, which can transfer money to the wagering game machine 1800.

The player input device 1824 comprises a plurality of push buttons on a button panel 1826 for operating the wagering game machine 1800. In addition, or alternatively, the player input device 1824 can comprise a touch screen 1828 mounted over the primary display 1814 and/or secondary display 1816.

The various components of the wagering game machine 1800 can be connected directly to, or contained within, the housing 1812. Alternatively, some of the wagering game machine's components can be located outside of the housing 1812, while being communicatively coupled with the wagering game machine 1800 using any suitable wired or wireless communication technology.

The operation of the basic wagering game can be displayed to the player on the primary display 1814. The primary display 1814 can also display a bonus game associated with the basic wagering game. The primary display 1814 can include a cathode ray tube (CRT), a high resolution liquid crystal display (LCD), a plasma display, light emitting diodes (LEDs), or any other type of display suitable for use in the wagering game machine 1800. Alternatively, the primary display 1814 can include a number of mechanical reels to display the outcome. In FIG. 18, the wagering game machine 1800 is an "upright" version in which the primary display 1814 is oriented vertically relative to the player. Alternatively, the wagering game machine can be a "slant-top" version in which the primary display 1814 is slanted at about a thirty-degree angle toward the player of the wagering game machine 1800. In yet another embodiment, the wagering game machine 1800 can exhibit any suitable form factor, such as a free standing model, bartop model, mobile handheld model, or workstation console model.

A player begins playing a basic wagering game by making a wager via the value input device 1818. The player can initiate play by using the player input device's buttons or touch screen 1828. The basic game can include arranging a plurality of symbols along a payline 1832, which indicates one or more outcomes of the basic game. Such outcomes can be randomly selected in response to player input. At least one of the outcomes, which can include any variation or combination of symbols, can trigger a bonus game.

In some embodiments, the wagering game machine 1800 can also include an information reader 1852, which can include a card reader, ticket reader, bar code scanner, RFID transceiver, or computer readable storage medium interface. In some embodiments, the information reader 1852 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method of operating a gaming system, said method comprising:
　capturing, via an image capture device of a mobile device, an image of media content of a wagering game machine at a wagering game establishment;
　determining, via a geographic location tracking device of the mobile device, a geographic location of the mobile device when the image of the media content is captured;
　determining, via a compass of the mobile device, a direction that a lens of the image capture device is facing when the image of the media content is captured;
　identifying, via one or more electronic processing units of the gaming system, the wagering game machine based on the geographic location and based on the direction that the lens of the image capture device is facing;
　in response to the identifying the wagering game machine, determining that a player account is associated with the mobile device based on evaluation of data from the mobile device against contact information in the player account;
　determining past wagering game activity of the player account that occurred at the wagering game machine prior to the capturing of the image of the media content;
　determining, by at least one of the one or more electronic processing units, overlay imagery derived from analysis of the past wagering game activity;

in response to the determining the overlay imagery, compositing, by at least one of the one or more electronic processing units, the overlay imagery onto the image of the media content to create a composited media content; and providing, by at least one of the one or more electronic processing units, the composited media content for presentation on a display of the mobile device.

2. The method of claim 1, wherein the determining the geographic location of the mobile device comprises determining the geographic location of the mobile device with a global positioning system module of the mobile device.

3. The method of claim 1, wherein the determining the geographic location of the mobile device comprises determining the geographic location of the mobile device using a cellular infrastructure to triangulate the geographic location of the mobile device.

4. The method of claim 1 further comprising:
determining, from electronic data stored in a memory, a winning trend or a losing trend over a time period for a player at the wagering game machine, wherein the determining the winning trend or the losing trend comprises one or more of determining a last time a highest jackpot was awarded for the player at the wagering game machine or a frequency of hitting a jackpot for the player at the wagering game machine; and using, as the past wagering game activity that occurred at the wagering game machine, either the winning trend or the losing trend.

5. The method of claim 1, further comprising:
initiating, in response to an input indicative of a wager by a user of the mobile device, a wagering game associated with another wagering game machine, the initiating the wagering game including:
receiving the input indicative of the wager, and
displaying, by an electronic display device of the another wagering game machine, an outcome of the wagering game,
wherein the wagering game machine includes a first theme and the another wagering game machine includes a second theme, the second theme being different from the first theme,
wherein the composited media content includes a recommendation of the second theme, and
wherein the initiating is based at least in part on display of the composited media content.

6. The method of claim 1, wherein the determining the overlay imagery derived from the analysis of the past wagering game activity of the player account comprises determining a game level yet to be attained via play of a wagering game, and wherein the overlay imagery indicates information regarding one or more of the game level or potential attainment of the game level.

7. The method of claim 1, wherein the player account is provided by at least one of the wagering game establishment or a manufacturer of the wagering game machine.

8. One or more non-transitory, machine-readable storage media including instructions which, when executed by one or more processors, cause the one or more processors to perform operations comprising:
capturing, via an image capture device of a mobile device, an image of media content of a wagering game machine at a wagering game establishment;
determining, via a geographic location tracking device of the mobile device, a geographic location of the mobile device when the image of the media content is captured;
determining, via a compass of the mobile device, a direction that a lens of the image capture device is facing when the image of the media content is captured;
identifying the wagering game machine based on the geographic location and based on the direction that the lens of the image capture device is facing;
determining, in response to the identifying the wagering game machine, overlay imagery derived from a monetary amount wagered by a player at the wagering game machine prior to the capturing of the image of the media content;
compositing, in response to the determining the overlay imagery, the overlay imagery onto the image of the media content to create a composited media content;
providing the composited media content to display on a display of the mobile device;
determining, as the monetary amount wagered by the player, a winning trend or a losing trend over a time period for the player associated with the wagering game machine; and
determining that the overlay imagery varies based on either the winning trend or the losing trend and based on whether the player is identified as a high value player to the wagering game establishment.

9. The one or more non-transitory, machine-readable storage media of claim 8, said operations further comprising determining either the winning trend or the losing trend based on a last time a highest jackpot was awarded for the player at the wagering game machine and a frequency of hitting a jackpot for the player at the wagering game machine.

10. A mobile device comprising:
a processor;
a camera;
a compass;
a display;
a global positioning system device; and
one or more memory storage devices configured to store instructions, which when executed by the processor cause the mobile device to
capture, via the camera, an image of media content of a wagering game machine at a wagering game establishment,
determine, via the global positioning system device, a geographic location of the mobile device when the image of the media content is captured,
determine, via the compass, a direction that a lens of the camera is facing when the image of the media content is captured,
identify the wagering game machine based on the geographic location and based on the direction that the lens of the camera is facing,
in response to identification of the wagering game machine, determine overlay imagery derived from past wagering game activity that occurred at the wagering game machine prior to the image of the media content being captured,
after determination of the overlay imagery, composite the overlay imagery onto the image of the media content to create a composited media content,
provide the composited media content for presentation on a display of the mobile device, and make one or more wagers relative to the past wagering game activity, wherein the one or more wagers comprise at least one of a group consisting of a wager that a jackpot win will be more than a past jackpot, a wager on whether a certain level of win will occur greater than a past level of win, and a wager on whether a certain number of symbols or a certain type of symbol will be part of an outcome of a wagering game based on whether the certain number of symbols or the certain type of symbol occurred as part of an outcome in the past.

11. A gaming system comprising:

one or more processors; and at least one memory storage device configured to store instructions, which when executed by at least one of the one or more processors cause the gaming system to perform operations to:

capture, via an image capture device of a mobile device, an image of media content of a wagering game machine at a wagering game establishment;

determine, via a global positioning system device of the mobile device, a geographic location of the mobile device when the image of the media content is captured;

determine, via a compass of the mobile device, a direction that a lens of the image capture device is facing when the image of the media content is captured;

identify the wagering game machine based on the geographic location of the mobile device and based on the direction that the lens of the image capture device is facing;

in response to identification of the wagering game machine, determine that a player account is associated with the mobile device based on evaluation of data from the mobile device against contact information in the player account;

determine past wagering game activity of the player account that occurred at the wagering game machine prior to the image of the media content being captured;

determine, based on analysis of the past wagering game activity of the player account, overlay imagery indicating the past wagering game activity of the player account;

composite the overlay imagery onto the image of the media content to create a composited media content; and provide the composited media content for presentation on a display of the mobile device.

12. One or more non-transitory, machine-readable storage media having instructions stored thereon, which when executed by one or more processors of a gaming system cause the gaming system to perform operations comprising:

capturing, via an image capture device of a mobile device, an image of media content of a wagering game machine at a wagering game establishment;

determining, via a global positioning system device of the mobile device, a geographic location of the mobile device when the image of the media content is captured;

determining, via a compass of the mobile device, a direction that a lens of the image capture device is facing when the image of the media content is captured;

identifying the wagering game machine based on the geographic location of the mobile device and based on the direction that the lens of the image capture device is facing;

in response to the identifying the wagering game machine, determining that a player account is associated with the mobile device based on evaluation of data from the mobile device against contact information in the player account;

determining past wagering game activity of the player account that occurred at the wagering game machine prior to the capturing of the image of the media content;

determining, based on analysis of the past wagering game activity of the player account, a game level yet to be attained via play of the wagering game;

determining overlay imagery that indicates information regarding one or more of the game level or potential attainment of the game level;

in response to the determining the overlay imagery, compositing the overlay imagery onto the image of the media content to create a composited media content; and providing the composited media content for presentation on a display of the mobile device.

13. A method of operating a gaming system, said method comprising:

capturing, via an image capture device of a mobile device, an image of media content of a wagering game machine at a wagering game establishment;

determining, via a global positioning system device of the mobile device, a geographic location of the mobile device when the image of the media content is captured;

determining, via a compass of the mobile device, a direction that a lens of the image capture device is facing when the image of the media content is captured;

identifying, via one or more electronic processing units of the gaming system, the wagering game machine based on the geographic location of the mobile device and based on the direction that the lens of the image capture device is facing;

in response to the identifying the wagering game machine, determining, by at least one of the one or more electronic processing units, overlay imagery derived from past wagering game activity that occurred at the wagering game machine prior to the capturing of the image of the media content;

in response to the determining the overlay imagery, compositing, by at least one of the one or more electronic processing units, the overlay imagery onto the image of the media content to create a composited media content;

providing, by at least one of the one or more electronic processing units, the composited media content for presentation on a display of the mobile device; and initiating, in response to an input indicative of a wager by a user of the mobile device, a wagering game associated with another wagering game machine, the initiating the wagering game including receiving the input indicative of the wager and displaying, by an electronic display device of the another wagering game machine, an outcome of the wagering game, wherein the wagering game machine includes a first theme and the another wagering game machine includes a second theme, the second theme being different from the first theme, wherein the composited media content includes a recommendation of the second theme, and wherein the initiating is based at least in part on display of the composited media content.

14. A method of operating a mobile device comprising:
capturing, via a camera of the mobile device, an image of media content of a wagering game machine at a wagering game establishment;
determining, via a global positioning system device of the mobile device, a geographic location of the mobile device when the image of the media content is captured;
determining, via a compass of the mobile device, a direction that a lens of the camera is facing when the image of the media content is captured;
identifying, via at least one of one or more processors of the mobile device, the wagering game machine based on the geographic location of the mobile device and based on the direction that the lens of the camera is facing;
in response to identification of the wagering game machine, determining, via at least one of the one or more processors of the mobile device, overlay imagery derived from past wagering game activity that occurred at the wagering game machine prior to the image of the media content being captured;
after determining the overlay imagery, compositing, via at least one of the one or more processors of the mobile device, the overlay imagery onto the image of the media content to create a composited media content;
providing the composited media content for presentation on a display of the mobile device; and
making, via at least one of the one or more processors of the mobile device, one or more wagers relative to the past wagering game activity, wherein the one or more wagers comprise at least one of a group consisting of a wager that a jackpot win will be more than a past jackpot, a wager on whether a certain level of win will occur greater than a past level of win, and a wager on whether a certain number of symbols or a certain type of symbol will be part of an outcome of a wagering game based on whether the certain number of symbols or the certain type of symbol occurred as part of an outcome in the past.

15. A gaming system comprising:
one or more processors; and
at least one memory storage device configured to store instructions, which when executed by at least one of the one or more processors cause the gaming system to perform operations to:
 capture, via an image capture device of a mobile device, an image of media content of a wagering game machine at a wagering game establishment;
 determine, via a global positioning system device of the mobile device, a geographic location of the mobile device when the image of the media content is captured;
 determine, via a compass of the mobile device, a direction that a lens of the image capture device is facing when the image of the media content is captured;
 identify the wagering game machine based on the geographic location of the mobile device and based on the direction that the lens of the image capture device is facing;
 in response to identification of the wagering game machine, determine overlay imagery derived from past wagering game activity that occurred at the wagering game machine prior to the image of the media content being captured;
 in response to determination of the overlay imagery, composite the overlay imagery onto the image of the media content to create a composited media content;
 provide the composited media content for presentation on a display of the mobile device; and
 initiate, in response to an input indicative of a wager by a user of the mobile device, a wagering game associated with another wagering game machine, wherein initiation of the wagering game includes receiving the input indicative of the wager and displaying, by an electronic display device of the another wagering game machine, an outcome of the wagering game, wherein the wagering game machine includes a first theme and the another wagering game machine includes a second theme, the second theme being different from the first theme, wherein the composited media content includes a recommendation of the second theme, and wherein the wagering game is initiated based at least in part on display of the composited media content.

16. A gaming system comprising:
one or more processors; and
at least one memory storage device configured to store instructions, which when executed by at least one of the one or more processors cause the gaming system to perform operations to:
 capture, via an image capture device of a mobile device, an image of media content of a wagering game machine at a wagering game establishment;
 determine, via a global positioning system device of the mobile device, a geographic location of the mobile device when the image of the media content is captured;
 determine, via a compass of the mobile device, a direction that a lens of the image capture device is facing when the image of the media content is captured;
 identify the wagering game machine based on the geographic location of the mobile device and based on the direction that the lens of the image capture device is facing;
 determine, in response to identification of the wagering game machine, overlay imagery derived from a monetary amount wagered by a player at the wagering game machine prior to the image of the media content being captured;
 composite, in response to determination of the overlay imagery, the overlay imagery onto the image of the media content to create a composited media content;
 provide the composited media content to display on a display of the mobile device;
 determine, as the monetary amount wagered by the player, a winning trend or a losing trend over a time period for the player associated with the wagering game machine; and
 determine that the overlay imagery varies based on either the winning trend or the losing trend and based on whether the player is identified as a high value player to the wagering game establishment.

* * * * *